US012795129B2

(12) United States Patent
Hendry

(10) Patent No.: US 12,795,129 B2
(45) Date of Patent: Nov. 10, 2026

(54) POINT CLOUD DATA TRANSMISSION DEVICE AND METHOD PERFORMED BY TRANSMISSION DEVICE, AND POINT CLOUD DATA RECEPTION DEVICE AND METHOD PERFORMED BY RECEPTION DEVICE

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 18/724,288

(22) PCT Filed: Jan. 11, 2023

(86) PCT No.: PCT/KR2023/000490

§ 371 (c)(1),
(2) Date: Jun. 26, 2024

(87) PCT Pub. No.: WO2023/136597

PCT Pub. Date: Jul. 20, 2023

(65) Prior Publication Data

US 2025/0227271 A1 Jul. 10, 2025

Related U.S. Application Data

(60) Provisional application No. 63/298,588, filed on Jan. 11, 2022, provisional application No. 63/298,547, filed on Jan. 11, 2022.

(51) Int. Cl.
*H04N 19/31* (2014.01)
*H04N 19/132* (2014.01)
(Continued)

(52) U.S. Cl.
CPC ........... *H04N 19/31* (2014.11); *H04N 19/132* (2014.11); *H04N 19/44* (2014.11); *H04N 19/597* (2014.11)

(58) Field of Classification Search
CPC .... H04N 19/132; H04N 19/44; H04N 19/597; H04N 19/31; H04N 19/46; H04N 19/70
See application file for complete search history.

(56) References Cited

U.S. PATENT DOCUMENTS

2020/0045323 A1 2/2020 Hannuksela
2021/0314626 A1* 10/2021 Kammachi Sreedhar .................. H04N 21/85406

(Continued)

FOREIGN PATENT DOCUMENTS

| | | |
|---|---|---|
| KR | 10-2021-0005524 | 1/2021 |
| WO | 2020/185878 A1 | 9/2020 |
| WO | WO 2021/123159 | 6/2021 |

OTHER PUBLICATIONS

3DG, "G-PCC Future Enhancements," ISO/IEC JTC 1/SC 29/WG 11, Coding of moving pictures and audio Convenorship: UNI (Italy), N19328, Jun. 2020, 147 pages.

(Continued)

*Primary Examiner* — Kathleen V Nguyen
(74) *Attorney, Agent, or Firm* — Fish & Richardson P.C.

(57) ABSTRACT

A transmission device of point cloud data, a method performed in the transmission device, a reception device, and a method performed in the reception device are provided. A method performed by a reception device of point cloud data may comprise identifying a track set including one or more tracks from the point cloud data based on a predetermined target temporal level and extracting one or more samples from the identified track set. Each track included in the track set may include a temporal level less than or equal to the target temporal level.

12 Claims, 21 Drawing Sheets

(51) Int. Cl.
*H04N 19/44* (2014.01)
*H04N 19/597* (2014.01)

(56) References Cited

U.S. PATENT DOCUMENTS

| | | | | |
|---|---|---|---|---|
| 2021/0360268 | A1 | 11/2021 | Drugeon et al. | |
| 2023/0281923 | A1* | 9/2023 | Gudumasu | H04N 19/597 345/419 |

OTHER PUBLICATIONS

ISO/IEC "Draft text of ISO/IEC FDIS 23090-18 Carriage of Geometry-based Point Cloud Compression Data," 135. MPEG meeting, Motion Picture Expert Group or ISO/IEC JTC1/SC29/WG11, Online, n20565, Oct. 2021.

Extended European Search Report in European Appln. No. 23740441.3, mailed on Oct. 15, 2025, 12 pages.

Gudumasu et al., "[43.1] On Temporal Scalability Support in ISO/IEC 23090-18," 136. MPEG meeting, Motion Picture Expert Group or ISO/IEC JTC1/SC29/WG11, Online, m58436, Dec. 2021.

Hendry et al., "[43.1] On player behavior for handling temporal scalability," 137. MPEG meeting, Motion Picture Expert Group or ISO/IEC JTC1/SC29/WG11, Online, m58988, Jan. 2022.

* cited by examiner

FIG. 12

| tile_inventory( ) { | Descriptor |
|---|---|
| tile_frame_idx | tbu |
| tile_seq_parameter_set_id | u(7) |
| tile_id_present_flag | u(1) |
| tile_cnt | u(16) |
| tile_bounding_box_bits | u(8) |
| for( tileIdx = 0; tileIdx < tile_cnt; tileIdx++ ) { | |
| if( tile_id_present_flag ) | |
| tile_id | ue(v) |
| for( k = 0; k < 3; k++ ) | |
| tile_bounding_box_offset_xyz[ tile_id ][ k ] | s(v) |
| for( k = 0; k < 3; k++ ) | |
| tile_bounding_box_size_xyz[ tile_id ][ k ] | u(v) |
| } | |
| for( k = 0; k < 3; k++ ) | |
| tile_origin_xyz[ k ] | se(v) |
| tile_origin_log2_scale | ue(v) |
| byte_alignment( ) | |
| } | |

FIG. 13

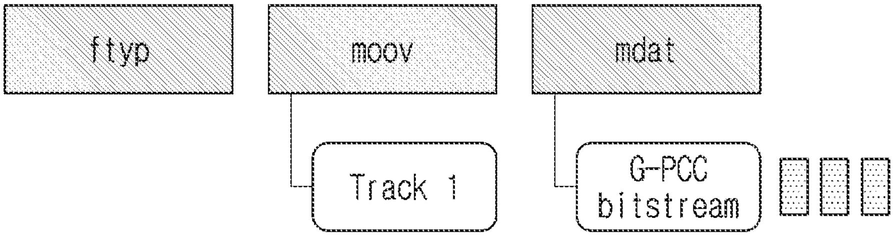

(a)

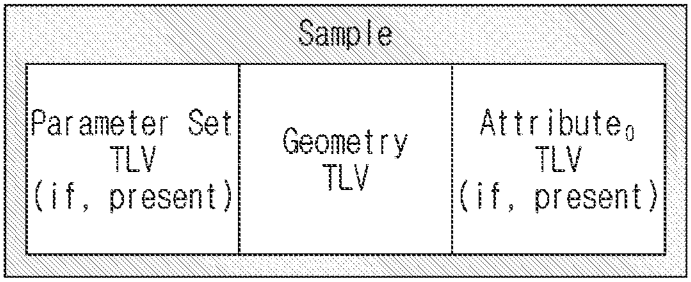

(b)

FIG. 14
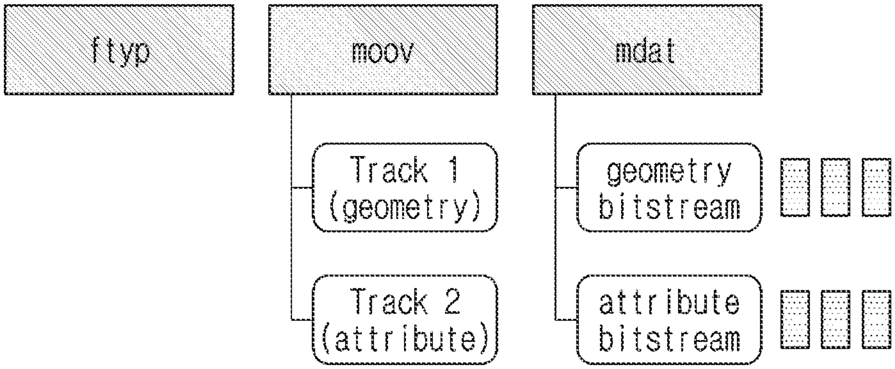
(a)
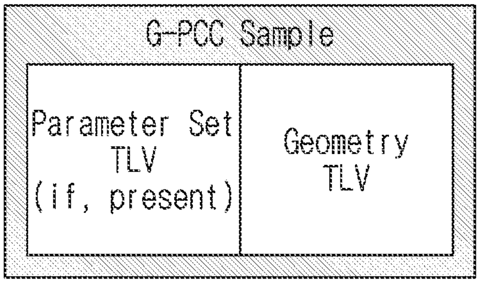
(b)

POINT CLOUD DATA TRANSMISSION DEVICE AND METHOD PERFORMED BY TRANSMISSION DEVICE, AND POINT CLOUD DATA RECEPTION DEVICE AND METHOD PERFORMED BY RECEPTION DEVICE

CROSS-REFERENCE TO RELATED APPLICATIONS

This application is a National Stage application under 35 U.S.C. § 371 of International Application No. PCT/KR2023/000490, filed on Jan. 11, 2023, which claims the benefit of U.S. Provisional Application No. 63/298,547, filed on Jan. 11, 2022, and U.S. Provisional Application No. 63/298,588, filed on Jan. 11, 2022. The disclosures of the prior applications are incorporated by reference in their entirety.

TECHNICAL FIELD

The present disclosure relates to a method and device for processing point cloud content.

BACKGROUND ART

Point cloud content is expressed as a point cloud which is a set of points belonging to a coordinate system representing a three-dimensional space. The point cloud content may represent three-dimensional media and is used to provide various services such as virtual reality (VR), augmented reality (AR), mixed reality (MR) and self-driving services. Since tens of thousands to hundreds of thousands of point data are required to express point cloud content, a method of efficiently processing a vast amount of point data is required.

DISCLOSURE

Technical Problem

An object of the present disclosure is to provide a method and device for efficiently processing point cloud data.

Another object of the present disclosure is to provide a method and device that supports temporal scalability for G-PCC files.

Another object of the present disclosure is to provide a method and device for performing a sample extraction process based on predetermined target parameter(s).

Another object of the present disclosure is to provide a method and device for discarding predetermined previously extracted samples and restarting a sample extraction process when certain target parameter(s) are changed.

Another object of the present disclosure is to provide a method and device for providing a point cloud content service that efficiently stores a G-PCC bitstream in a single track in a file or partitions and stores it in multiple tracks and provides signaling for the same.

Another object of the present disclosure is to provide a method and device for processing a file storage technique to support efficient access to a stored G-PCC bitstream.

The technical problems solved by the present disclosure are not limited to the above technical problems and other technical problems which are not described herein will become apparent to those skilled in the art from the following description.

Technical Solution

A method performed in a reception device of point cloud data according to an embodiment of the present disclosure may comprise identifying a track set including one or more tracks from the point cloud data based on a predetermined target temporal level and extracting one or more samples from the identified track set. Each track included in the track set may include a temporal level less than or equal to the target temporal level.

A reception device of point cloud data according to another embodiment of the present disclosure may comprise a memory and at least one processor. The at least one processor may identify a track set including one or more tracks from the point cloud data based on a predetermined target temporal level and extract one or more samples from the identified track set. Each track included in the track set may include a temporal level less than or equal to the target temporal level.

A method performed in a transmission device of point cloud data according to another embodiment of the present disclosure may comprise partitioning a bitstream including the point cloud data and storing it in a plurality of tracks and generating a geometry-based point cloud compression (G-PCC) file based on the tracks. The plurality of tracks may include at least one of temporal level tracks or temporal level tile tracks, the temporal level tracks may be decapsulated by a sample extraction process based on a predetermined target temporal level, and the temporal level tile tracks may be decapsulated by a sample extraction process based on the target temporal level and a predetermined target tile identifier list.

A transmission device of point cloud data according to another embodiment of the present disclosure may comprise a memory and at least one processor. The at least one processor may partition a bitstream including the point cloud data and store it in a plurality of tracks, and generate a geometry-based point cloud compression (G-PCC) file based on the tracks. The plurality of tracks may include at least one of temporal level tracks or temporal level tile tracks, the temporal level tracks may be decapsulated by a sample extraction process based on a predetermined target temporal level, and the temporal level tile tracks may be decapsulated by a sample extraction process based on the target temporal level and a predetermined target tile identifier list.

Advantageous Effects

According to the present disclosure, it is possible to provide a method and device for efficiently processing point cloud data.

Also, according to the present disclosure, it is possible to provide a method and device that supports temporal scalability for G-PCC files.

Also, according to the present disclosure, it is possible to provide a method and device for performing a sample extraction process based on predetermined target parameter (s).

Also, according to the present disclosure, it is possible to provide a method and device for discarding predetermined previously extracted samples and restarting a sample extraction process when certain target parameter(s) are changed.

Also, according to the present disclosure, it is possible to provide a method and device for providing a point cloud content service that efficiently stores a G-PCC bitstream in a single track in a file or partitions and stores it in multiple tracks and provides signaling for the same.

Also, according to the present disclosure, it is possible to provide a method and device for processing a file storage technique to support efficient access to a stored G-PCC bitstream.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 12 shows an example of a tile inventory syntax structure according to embodiments of the present disclosure.

FIG. 13 illustrates an example of a file including a single track according to embodiments of the present disclosure.

FIG. 14 illustrates an example of a file including multiple tracks according to embodiments of the present disclosure.

MODE FOR INVENTION

Figure 1:
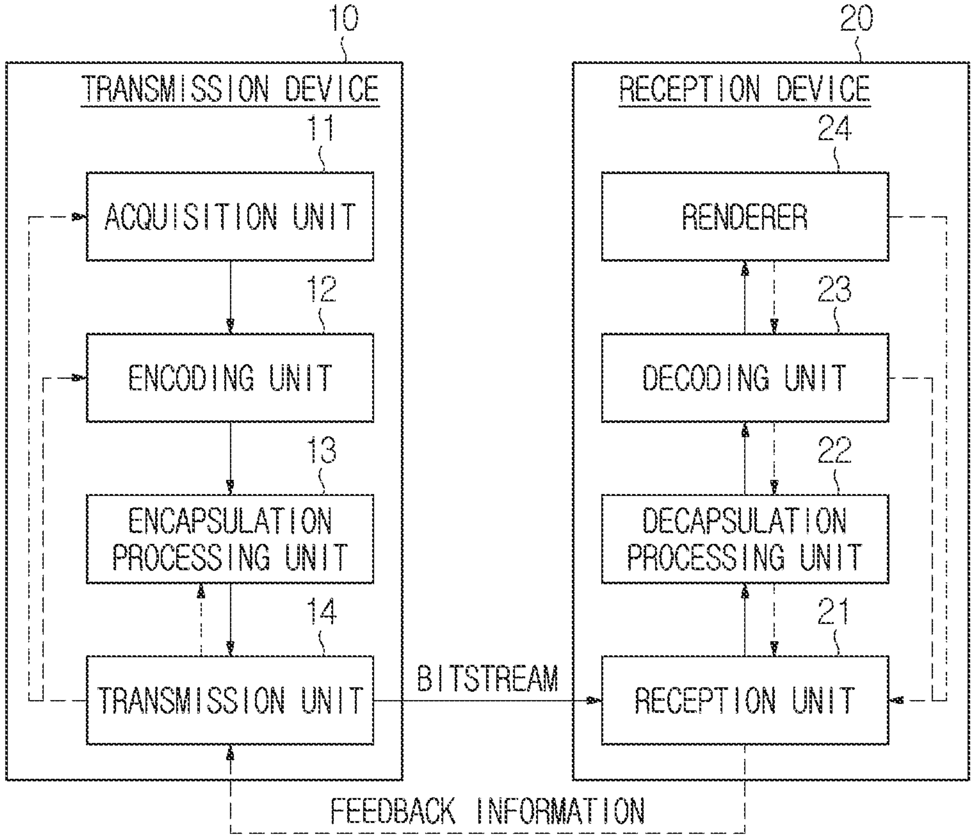
FIG. 1 is a block diagram illustrating an example of a point cloud content provision system according to embodiments of the present disclosure.

Hereinafter, embodiments of the present disclosure will be described in detail with reference to the accompanying drawings so that those of ordinary skill in the art to which the present disclosure pertains can easily implement them. The present disclosure may be embodied in several different forms and is not limited to the embodiments described herein.

In describing the present disclosure, a detailed description of known functions and configurations will be omitted when it may obscure the subject matter of the present disclosure. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which another component exists in therebetween. In addition, when it is said that a component "includes" or "has" another component, this indicates that the other components are not excluded, but may be further included unless specially described.

In the present disclosure, terms such as first, second, etc. are used only for the purpose of distinguishing one component from other components, and, unless otherwise specified, the order or importance of the components is not limited. Accordingly, within the scope of the present disclosure, a first component in one embodiment may be referred to as a second component in another embodiment, and, similarly, a second component in one embodiment is referred to as a first component in another embodiment.

In the present disclosure, components that are distinguished from each other are for clearly explaining features thereof, and do not necessarily mean that the components are separated. That is, a plurality of components may be integrated to form one hardware or software unit, or one component may be distributed to form a plurality of hardware or software units. Accordingly, even if not specifically mentioned, such integrated or distributed embodiments are also included in the scope of the present disclosure.

In the present disclosure, components described in various embodiments do not necessarily mean essential components, and some thereof may be optional components. Accordingly, an embodiment composed of a subset of components described in one embodiment is also included in the scope of the present disclosure. In addition, embodiments including other components in addition to components described in various embodiments are also included in the scope of the present disclosure.

The present disclosure relates to encoding and decoding of point cloud-related data, and terms used in the present disclosure may have general meanings commonly used in the technical field to which the present disclosure belongs unless they are newly defined in the present disclosure.

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to compression of point cloud-related data. Various methods or embodiments of the present disclosure may be applied to a point cloud compression or point cloud coding (PCC) standard (e.g., G-PCC or V-PCC standard) of a moving picture experts group (MPEG) or a next-generation video/image coding standard.

In the present disclosure, a "point cloud" may mean a set of points located in a three-dimensional space. Also, in the present disclosure, "point cloud content" is expressed as a point cloud, and may mean a "point cloud video/image". Hereinafter, the 'point cloud video/image' is referred to as a 'point cloud video'. A point cloud video may include one or more frames, and one frame may be a still image or a picture. Accordingly, the point cloud video may include a point cloud image/frame/picture, and may be referred to as any one of a "point cloud image", a "point cloud frame", and a "point cloud picture".

In the present disclosure, "point cloud data" may mean data or information related to each point in the point cloud. Point cloud data may include geometry and/or attribute. In addition, the point cloud data may further include metadata. The point cloud data may be referred to as "point cloud content data" or "point cloud video data" or the like. In addition, the point cloud data may be referred to as "point cloud content", "point cloud video", "G-PCC data", and the like.

In the present disclosure, a point cloud object corresponding to point cloud data may be represented in a box shape based on a coordinate system, and the box shape based on the coordinate system may be referred to as a bounding box. That is, the bounding box may be a rectangular cuboid capable of accommodating all points of the point cloud, and may be a cuboid including a source point cloud frame.

In the present disclosure, geometry includes the position (or position information) of each point, and the position may be expressed by parameters (e.g., for example, an x-axis value, a y-axis value, and a z-axis value) representing a three-dimensional coordinate system (e.g., a coordinate system consisting of an x-axis, y-axis, and z-axis). The geometry may be referred to as "geometric information".

In the present disclosure, the attribute may include properties of each point, and the properties may include one or more of texture information, color (RGB or YCbCr), reflectance (r), transparency, etc. of each point. The attribute may be referred to as "attribute information". Metadata may include various data related to acquisition in an acquisition process to be described later.

Overview of Point Cloud Content Provision System

Figure 2:
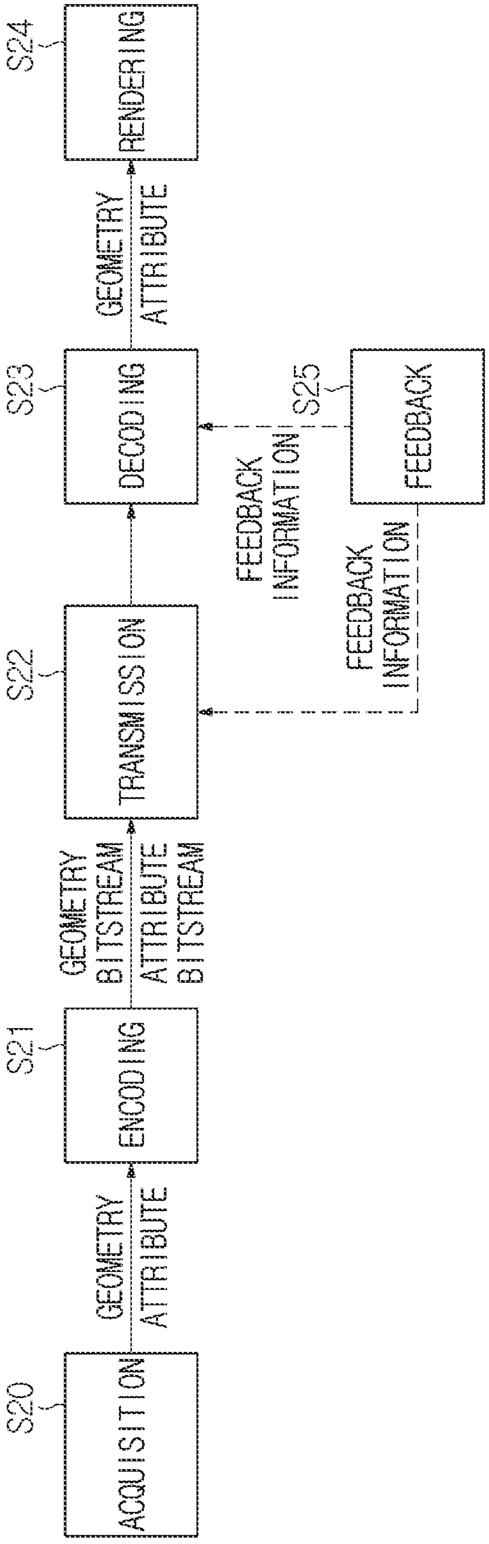
FIG. 2 is a block diagram illustrating an example of a point cloud content provision process according to embodiments of the present disclosure.

FIG. 1 illustrates an example of a system for providing point cloud content (hereinafter, referred to as a 'point cloud content provision system') according to embodiments of the present disclosure. FIG. 2 illustrates an example of a process in which the point cloud content provision system provides point cloud content.

As shown in FIG. 1, the point cloud content provision system may include a transmission device 10 and a reception device 20. The point cloud content provision system may perform an acquisition process S20, an encoding process S21, a transmission process S22, a decoding process S23, a rendering process S24 and/or a feedback process S25 shown in FIG. 2 by operation of the transmission device 10 and the reception device 20.

The transmission device 10 acquires point cloud data and outputs a bitstream through a series of processes (e.g., encoding process) for the acquired point cloud data (source point cloud data), in order to provide point cloud content. Here, the point cloud data may be output in the form of a bitstream through an encoding process. In some embodiments, the transmission device 10 may transmit the output bitstream in the form of a file or streaming (streaming segment) to the reception device 20 through a digital storage medium or a network. The digital storage medium may include a variety of storage media such as USB, SD, CD. DVD, Blu-ray, HDD, and SSD. The reception device 20 may process (e.g., decode or reconstruct) the received data (e.g., encoded point cloud data) into source point cloud data and render it. The point cloud content may be provided to the user through these processes, and the present disclosure may provide various embodiments necessary to effectively perform a series of these processes.

As illustrated in FIG. 1, the transmission device 10 may include an acquisition unit 11, an encoding unit 12, an encapsulation processing unit 13 and a transmission unit 14, and the reception device 20 may include a reception unit 21, a decapsulation processing unit 22, a decoding unit 23, and a rendering unit 24.

The acquisition unit 11 may perform a process S20 of acquiring a point cloud video through a capturing, synthesizing or generating process. Accordingly, the acquisition unit 11 may be referred to as a 'point cloud video acquisition unit'.

Point cloud data (geometry and/or attribute, etc.) for a plurality of points may be generated by the acquisition process (S20). Also, through the acquisition process (S20), metadata related to the acquisition of the point cloud video may be generated. Also, mesh data (e.g., triangular data) indicating connection information between point clouds may be generated by the acquisition process (S20).

The metadata may include initial viewing orientation metadata. The initial viewing orientation metadata may indicate whether the point cloud data is data representing the front or the back. The metadata may be referred to as "auxiliary data" that is metadata for the point cloud.

The acquired point cloud video may include the polygon file format or the Stanford triangle format (PLY) file. Since the point cloud video has one or more frames, the acquired point cloud video may include one or more PLY files. The PLY file may include point cloud data of each point.

In order to acquire a point cloud video (or point cloud data), the acquisition unit 11 may be composed of a combination of camera equipment capable of acquiring depth (depth information) and RGB cameras capable of extracting color information corresponding to the depth information. Here, the camera equipment capable of acquiring the depth information may be a combination of an infrared pattern projector and an infrared camera. In addition, the acquisition unit 11 may be composed of a LiDAR, and the LiDAR may use a radar system for measuring the position coordinates of a reflector by measuring a time required for a laser pulse to be emitted and returned after being reflected.

The acquisition unit 110 may extract a shape of geometry composed of points in a three-dimensional space from the depth information, and may extract an attribute representing a color or reflection of each point from the RGB information.

As a method of extracting (or capturing, acquiring, etc.) a point cloud video (or point cloud data), there may be an inward-facing method of capturing a central object and an outward-facing method of capturing an external environment.

Meanwhile, when attempting to provide a point cloud video of a computer-generated virtual space, capture through an actual camera may not be performed. In this case, post-processing may be necessary to improve the quality of the captured point cloud content. For example, during the acquisition process (S20), the maximum/minimum depth values may be adjusted within the range provided by the camera equipment, but post-processing is required to remove a unwanted area (e.g., background) or point data of the unwanted area or post-processing may be performed to recognize connected spaces and fill spatial holes. As another example, post-processing may be performed to integrate point cloud data extracted from cameras sharing a spatial coordinate system into one content through a transform process into a global coordinate system for each point based on the position coordinates of each camera. Through this, a single wide range of point cloud content may be generated, or point cloud content with a high density of points may be acquired.

The encoding unit 12 may perform the encoding process (S21) of encoding the data (e.g., geometry, attribute and/or metadata, and/or mesh data, etc.) generated by the acquisition unit 11 into one or more bitstreams. Accordingly, the encoding unit 12 may be referred to as a 'point cloud video encoder'. The encoding unit 12 may encode the data generated by the acquisition unit 11 in series or in parallel.

The encoding process S21 performed by the encoding unit 12 may be geometry-based point cloud compression (G-PCC). The encoding unit 12 may perform a series of procedures such as prediction, transform, quantization, and entropy coding for compression and coding efficiency.

The encoded point cloud data may be output in the form of a bitstream. Based on the G-PCC procedure, the encoding unit 12 may partition the point cloud data into geometry and attribute and encode them as described below. In this case, the output bitstream may include a geometry bitstream including the encoded geometry and an attribute bitstream including the encoded attribute. In addition, the output bitstream may further include one or more of a metadata bitstream including metadata, an auxiliary bitstream including auxiliary data, and a mesh data bitstream including mesh data. The encoding process (S21) will be described in more detail below. A bitstream including the encoded point cloud data may be referred to as a 'point cloud bitstream' or a 'point cloud video bitstream'.

The encapsulation processing unit 13 may perform a process of encapsulating one or more bitstreams output from the decoding unit 12 in the form of a file or a segment. Accordingly, the encapsulation processing unit 13 may be referred to as a 'file/segment encapsulation module'. Although the drawing shows an example in which the encapsulation processing unit 13 is composed of a separate component/module in relation to the transmission unit 14, the encapsulation processing unit 13 may be included in the transmission unit 14 in some embodiments.

The encapsulation processing unit 13 may encapsulate the data in a file format such as ISO Base Media File Format (ISOBMFF) or process the data in the form of other DASH segments. In some embodiments, the encapsulation processing unit 13 may include metadata in a file format. Metadata may be included, for example, in boxes of various levels in the ISOBMFF file format, or as data in a separate track within the file. In some embodiments, the encapsulation processing unit 130 may encapsulate the metadata itself into a file. The metadata processed by the encapsulation processing unit 13 may be transmitted from a metadata processing unit not shown in the drawing. The metadata processing unit may be included in the encoding unit 12 or may be configured as a separate component/module.

The transmission unit 14 may perform the transmission process (S22) of applying processing (processing for transmission) according to a file format to the 'encapsulated point cloud bitstream'. The transmission unit 140 may transmit the bitstream or a file/segment including the bitstream to the reception unit 21 of the reception device 20 through a digital storage medium or a network. Accordingly, the transmission unit 14 may be referred to as a 'transmitter' or a 'communication module'.

The transmission unit 14 may process point cloud data according to an arbitrary transmission protocol. Here, 'processing the point cloud data according to the arbitrary transmission protocol' may be 'processing for transmission'. The processing for transmission may include processing for transmission through a broadcast network, processing for transmission through a broadband, and the like. In some embodiments, the transmission unit 14 may receive not only point cloud data but also metadata from the metadata processing unit, and may perform processing for transmission on the transmitted metadata. In some embodiments, the processing for transmission may be performed by the transmission processing unit, and the transmission processing unit may be included in the transmission unit 14 or configured as a component/module separate from the transmission unit 14.

The reception unit 21 may receive the bitstream transmitted by the transmission device 10 or a file/segment including the bitstream. Depending on the transmitted channel, the reception unit 21 may receive a bitstream or a file/segment including the bitstream through a broadcast network, or may receive a bitstream or a file/segment including the bitstream through a broadband. Alternatively, the reception unit 21 may receive a bitstream or a file/segment including the bitstream through a digital storage medium.

The reception unit 21 may perform processing according to a transmission protocol on the received bitstream or the file/segment including the bitstream. The reception unit 21 may perform a reverse process of transmission processing (processing for transmission) to correspond to processing for transmission performed by the transmission device 10. The reception unit 21 may transmit the encoded point cloud data among the received data to the decapsulation processing unit 22 and may transmit metadata to a metadata parsing unit. The metadata may be in the form of a signaling table. In some embodiments, the reverse process of the processing for transmission may be performed in the reception processing unit. Each of the reception processing unit, the decapsulation processing unit 22, and the metadata parsing unit may be included in the reception unit 21 or may be configured as a component/module separate from the reception unit 21.

The decapsulation processing unit 22 may decapsulate the point cloud data (i.e., a bitstream in a file format) in a file format received from the reception unit 21 or a reception processing unit. Accordingly, the decapsulation processing unit 22 may be referred to as a 'file/segment decapsulation module'.

The decapsulation processing unit 22 may acquire a point cloud bitstream or a metadata bitstream by decapsulating files according to ISOBMFF or the like. In some embodiments, metadata (metadata bitstream) may be included in the point cloud bitstream. The acquired point cloud bitstream may be transmitted to the decoding unit 23, and the acquired metadata bitstream may be transmitted to the metadata processing unit. The metadata processing unit may be included in the decoding unit 23 or may be configured as a separate component/module. The metadata obtained by the decapsulation processing unit 23 may be in the form of a box or track in a file format. If necessary, the decapsulation processing unit 23 may receive metadata required for decapsulation from the metadata processing unit. The metadata may be transmitted to the decoding unit 23 and used in the decoding process (S23), or may be transmitted to the rendering unit 24 and used in the rendering process (S24).

The decoding unit 23 may receive the bitstream and perform operation corresponding to the operation of the encoding unit 12, thereby performing the decoding process (S23) of decoding the point cloud bitstream (encoded point cloud data). Accordingly, the decoding unit 23 may be referred to as a 'point cloud video decoder'.

The decoding unit 23 may partition the point cloud data into geometry and attribute and decode them. For example, the decoding unit 23 may reconstruct (decode) geometry from a geometry bitstream included in the point cloud bitstream, and restore (decode) attribute based on the reconstructed geometry and an attribute bitstream included in the point cloud bitstream. A three-dimensional point cloud video/image may be reconstructed based on position information according to the reconstructed geometry and attribute (such as color or texture) according to the decoded attribute. The decoding process (S23) will be described in more detail below.

The rendering unit 24 may perform the rendering process S24 of rendering the reconstructed point cloud video. Accordingly, the rendering unit 24 may be referred to as a 'renderer'.

The rendering process S24 may refer to a process of rendering and displaying point cloud content in a 3D space. The rendering process S24 may perform rendering according to a desired rendering method based on the position information and attribute information of the points decoded through the decoding process.

Points of point cloud content may be rendered as a vertex with a certain thickness, a cube with a specific minimum size and with the vertex position as the center, or a circle with the vertex position as the center. A user may view all or part of the rendered result through a VR/AR display or a regular display. The rendered video may be displayed through the display unit. The user may view all or part of the rendered result through a VR/AR display or a regular display.

The feedback process S25 may include a process of transmitting various feedback information that may be acquired during the rendering process S24 or the display process to the transmission device 10 or to other components in the reception device 20. The feedback process S25 may be performed by one or more of the components included in the reception device 20 of FIG. 1 or may be performed by one or more of the components shown in FIGS. 10 and 11. In some embodiments, the feedback process S25 may be performed by a 'feedback unit' or a 'sensing/tracking unit'.

Interactivity for point cloud content consumption may be provided through the feedback process (S25). In some embodiments, head orientation information, viewport information indicating the area that the user is currently viewing, etc. may be fed back in the feedback process (S25). In some embodiments, the user may interact with things implemented on the VR/AR/MR/autonomous driving environment, in which case information related to the interaction may be sent to the transmission device 10 or the service provider in the feedback process (S25). In some embodiments, the feedback process (S25) may not be performed.

Head orientation information may refer to information about the user's head position, angle, movement, etc. Based on this information, information about the area that the user is currently viewing within the point cloud video, that is, viewport information, may be calculated.

Viewport information may be information about the area that the user is currently viewing in the point cloud video. The viewpoint is the point the user is looking at in the point cloud video, and may mean the exact center of the viewport area. In other words, the viewport is an area centered on the viewpoint, and the size and shape occupied by the area may be determined by the field of view (FOV). Through gaze analysis using viewport information, it may be confirmed how the user consumes the point cloud video, which area of the point cloud video and how much they gaze. Gaze analysis may be performed on the reception side (reception device) and transmitted to the transmission side (transmission device) through a feedback channel. Devices such as VR/AR/MR displays may extract the viewport area based on the user's head position/orientation and the vertical or horizontal FOV supported by the device.

In some embodiments, feedback information may not only be sent to the transmission side (transmission device), but may also be consumed at the reception side (reception device). That is, the decoding process, rendering process, etc. of the reception side (reception device) may be performed using the feedback information.

For example, the reception device 20 may preferentially decode and render only the point cloud video for the area that the user is currently viewing using head orientation information and/or viewport information. Additionally, the reception unit 21 may receive all point cloud data, or may receive point cloud data indicated by orientation information and/or viewport information based on the orientation information and/or viewport information. Additionally, the decapsulation processing unit 22 may decapsulate all point cloud data or decapsulate point cloud data indicated by orientation information and/or viewport information based on the orientation information and/or viewport information. Additionally, the decoding unit 23 may decode all point cloud data or may decode point cloud data indicated by orientation information and/or viewport information based on the orientation information and/or viewport information.

Overview of Point Cloud Encoding Apparatus

Figure 3:
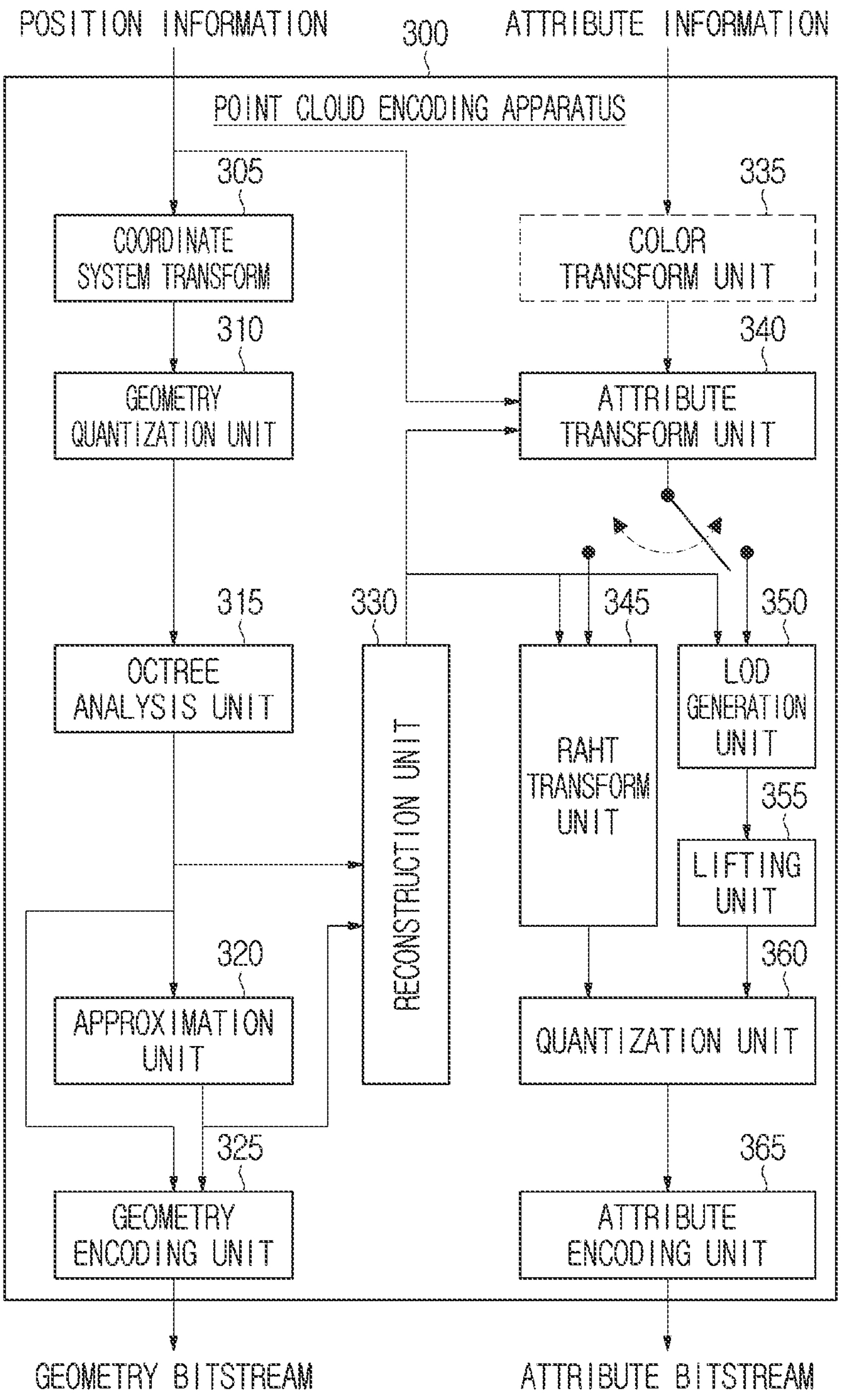
FIG. 3 is a diagram illustrating an example of a point cloud encoding apparatus according to embodiments of the present disclosure.

FIG. 3 illustrates an example of a point cloud encoding apparatus 300 according to embodiments of the present disclosure. The point cloud encoding apparatus 300 of FIG. 3 may correspond to the encoding unit 12 of FIG. 1 in terms of the configuration and function.

As shown in FIG. 3, the point cloud encoding apparatus 300 may include a coordinate system transform unit 305, a geometry quantization unit 310, an octree analysis unit 315, an approximation unit 320, a geometry encoding unit 325, a reconstruction unit 330, and an attribute transform unit 340, a RAHT transform unit 345, an LOD generation unit 350, a lifting unit 355, an attribute quantization unit 360, an attribute encoding unit 365, and/or a color transform unit 335.

The point cloud data acquired by the acquisition unit 11 may undergo processes of adjusting the quality of the point cloud content (e.g., lossless, lossy, near-lossless) according to the network situation or application. In addition, each point of the acquired point cloud content may be transmitted without loss, but, in that case, real-time streaming may not be possible because the size of the point cloud content is large. Therefore, in order to provide the point cloud content smoothly, a process of reconstructing the point cloud content according to a maximum target bitrate is required.

Processes of adjusting the quality of the point cloud content may be processes of reconstructing and encoding the position information (position information included in the geometry information) or color information (color information included in the attribute information) of the points. A process of reconstructing and encoding position information of points may be referred to as geometry coding, and a process of reconstructing and encoding attribute information associated with each point may be referred to as attribute coding.

Geometry coding may include a geometry quantization process, a voxelization process, an octree analysis process, an approximation process, a geometry encoding process, and/or a coordinate system transform process. Also, geometry coding may further include a geometry reconstruction process. Attribute coding may include a color transform process, an attribute transform process, a prediction transform process, a lifting transform process, a RAHT transform process, an attribute quantization process, an attribute encoding process, and the like.

Geometry Coding

The coordinate system transform process may correspond to a process of transforming a coordinate system for positions of points. Therefore, the coordinate system transform process may be referred to as 'transform coordinates'. The coordinate system transform process may be performed by the coordinate system transform unit 305. For example, the coordinate system transform unit 305 may transform the positions of the points from the global space coordinate system to position information in a three-dimensional space (e.g., a three-dimensional space expressed in coordinate system of the X-axis, Y-axis, and Z-axis). Position information in the 3D space according to embodiments may be referred to as 'geometric information'.

The geometry quantization process may correspond to a process of quantizing the position information of points, and may be performed by the geometry quantization unit 310. For example, the geometry quantization unit 310 may find position information having minimum (x, y, z) values among the position information of the points, and subtract position information having the minimum (x, y, z) positions from the position information of each point. In addition, the geometry quantization unit 310 may multiply the subtracted value by a preset quantization scale value, and then adjust (lower or raise) the result to a near integer value, thereby performing the quantization process.

The voxelization process may correspond to a process of matching geometry information quantized through the quantization process to a specific voxel present in a 3D space. The voxelization process may also be performed by the geometry quantization unit 310. The geometry quantization unit 310 may perform octree-based voxelization based on position information of the points, in order to reconstruct each point to which the quantization process is applied.

The voxel may refer to a space for storing information on points that exist in three dimensions, similar to a pixel, which is the minimum unit containing information on a two-dimensional image/video. The voxel is a portmanteau word combining the words volume and pixel.

Only one point may not exist (match) in one voxel. That is, information related to multiple points may exist in one voxel. Alternatively, information related to multiple points included in one voxel may be integrated into one point information. This adjustment may be performed selectively. When expressing information by integrating it into one point information in one voxel, the position value of the center point of the voxel may be set based on the position values of the points existing within the voxel, and an attribute transform process related to this needs to be performed. For example, the attribute transform process may be adjusted by the position value of the points included in the voxel or the center point of the voxel and the average value of the color or reflectance of neighboring points within a specific radius.

The octree analysis unit 315 may use an octree to efficiently manage the area/position of the voxel. The octree may be expressed as an occupancy code. For example, if a point is included in each node, the octree analysis unit 315 may express the occupancy code of the node as 1, and if the point is not included, the octree analysis unit 315 may express the occupancy code of the node as 0.

The geometry encoding process may correspond to a process of performing entropy coding on the occupancy code. The geometry encoding process may be performed by the geometry encoding unit 325. The geometry encoding unit 325 may perform entropy coding on the occupancy code. The generated occupancy code may be immediately encoded or may be encoded through an intra/inter coding process to increase compression efficiency. The reception device 20 may reconstruct the octree through the occupancy code.

On the other hand, in the case of a specific area having no points or very few points, it may be inefficient to voxelize all areas. That is, since there are few points in a specific area, it may not be necessary to construct the entire octree. For this case, an early termination method may be required.

The point cloud encoding apparatus 300 may directly transmit the positions of points only for the specific area, or reconfigure positions of points within the specific area based on the voxel using a surface model, instead of partitioning a node (specific node) corresponding to this specific area into 8 sub-nodes (children nodes) for the specific area (a specific area that does not correspond to a leaf node).

A mode for directly transmitting the position of each point for a specific node may be a direct mode. The point cloud encoding apparatus 300 may check whether conditions for enabling the direct mode are satisfied.

The conditions for enabling the direct mode are: 1) the option to use the direct mode shall be enabled, 2) the specific node does not correspond to a leaf node, and 3) points below a threshold shall exist within the specific node, and 4) the total number of points to be directly transmitted does not exceed a limit value.

When all of the above conditions are satisfied, the point cloud encoding apparatus 300 may entropy-code and transmit the position value of the point directly for the specific node through the geometry encoding unit 325.

A mode in which a position of a point in a specific area is reconstructed based on a voxel using a surface model may be a trisoup mode. The trisoup mode may be performed by the approximation unit 320. The approximation unit 320 may determine a specific level of the octree and reconstruct the positions of points in the node area based on the voxel using the surface model from the determined specific level.

The point cloud encoding apparatus 300 may selectively apply the trisoup mode. Specifically, the point cloud encoding apparatus 300 may designate a level (specific level) to which the trisoup mode is applied, when the trisoup mode is used. For example, when the specified specific level is equal to the depth (d) of the octree, the trisoup mode may not be applied. That is, the designated specific level shall be less than the depth value of the octree.

A three-dimensional cubic area of nodes of the designated specific level is called a block, and one block may include one or more voxels. A block or voxel may correspond to a brick. Each block may have 12 edges, and the approximation unit 320 may check whether each edge is adjacent to an occupied voxel having a point. Each edge may be adjacent to several occupied voxels. A specific position of an edge adjacent to a voxel is called a vertex, and, when a plurality of occupied voxels are adjacent to one edge, the approximation unit 320 may determine an average position of the positions as a vertex.

The point cloud encoding apparatus 300 may entropy-code the starting points (x, y, z) of the edge, the direction vector (Δx, Δy, Δz) of the edge and position value of the vertex (relative position values within the edge) through the geometry encoding unit 325, when a vertex is present.

The geometry reconstruction process may correspond to a process of generating a reconstructed geometry by reconstructing an octree and/or an approximated octree. The geometry reconstruction process may be performed by the reconstruction unit 330. The reconstruction unit 330 may perform a geometry reconstruction process through triangle reconstruction, up-sampling, voxelization, and the like.

When the trisoup mode is applied in the approximation unit 320, the reconstruction unit 330 may reconstruct a triangle based on the starting point of the edge, the direction vector of the edge and the position value of the vertex. The reconstruction unit 330 may perform an upsampling process for voxelization by adding points in the middle along the edge of the triangle. The reconstruction unit 330 may generate additional points based on an upsampling factor and the width of the block. These points may be called refined vertices. The reconstruction unit 330 may voxel the refined vertices, and the point cloud encoding apparatus 300 may perform attribute coding based on the voxelized position value.

In some embodiments, the geometry encoding unit 325 may increase compression efficiency by applying context adaptive arithmetic coding. The geometry encoding unit 325 may directly entropy-code the occupancy code using the arithmetic code. In some embodiments, the geometry encoding unit 325 adaptively performs encoding based on occupancy of neighbor nodes (intra coding), or adaptively performs encoding based on the occupancy code of a previous frame (inter-coding). Here, the frame may mean a set of point cloud data generated at the same time. Intra coding and inter coding are optional processes and thus may be omitted.

Compression efficiency can vary depending on how many neighboring nodes are referenced, and as the number of bits increases, the encoding process becomes more complicated, but compression efficiency can also be increased by making it biased to one side. For example, if it has a 3-bit context, it may be divided and coded in 23=8 ways. Since the divided coding part may affect the complexity of implementation, it is necessary to balance compression efficiency with an appropriate level of complexity.

Attribute Coding

Attribute coding may correspond to a process of coding attribute information based on reconstructed geometry and geometry before coordinate system transform (source geometry). Since the attribute may be dependent on the geometry, the reconstructed geometry may be utilized for attribute coding.

As described above, the attribute may include color, reflectance, and the like. The same attribute coding method may be applied to information or parameters included in the attribute. Color has three elements, reflectance has one element, and each element can be processed independently.

Attribute coding may include a color transform process, an attribute transform process, a prediction transform process, a lifting transform process, a RAHT transform process, an attribute quantization process, an attribute encoding process, and the like. The prediction transform process, the lifting transform process, and the RAHT transform process may be selectively used, or a combination of one or more thereof may be used.

The color transform process may correspond to a process of transforming the format of the color in the attribute into another format. The color transform process may be performed by the color transform unit 335. That is, the color transform unit 335 may transform the color in the attribute. For example, the color transform unit 335 may perform a coding operation for transforming the color in the attribute from RGB to YCbCr. In some embodiments, the operation of the color transform unit 335, that is, the color transform process, may be optionally applied according to a color value included in the attribute.

As described above, when one or more points exist in one voxel, position values for points existing in the voxel are set to the center point of the voxel in order to display them by integrating them into one point information for the voxel. Accordingly, a process of transforming the values of attributes related to the points may be required. Also, even when the trisoup mode is performed, the attribute transform process may be performed.

The attribute transform process may correspond to a process of transforming the attribute based on a position on which geometry coding is not performed and/or reconstructed geometry. For example, the attribute transform process may correspond to a process of transforming the attribute having a point of the position based on the position of a point included in a voxel. The attribute transform process may be performed by the attribute transform unit 340.

The attribute transform unit 340 may calculate the central position value of the voxel and an average value of the attribute values of neighbor points within a specific radius. Alternatively, the attribute transform unit 340 may apply a weight according to a distance from the central position to the attribute values and calculate an average value of the attribute values to which the weight is applied. In this case, each voxel has a position and a calculated attribute value.

The prediction transform process may correspond to a process of predicting an attribute value of a current point based on attribute values of one or more points (neighbor points) adjacent to the current point (a point corresponding to a prediction target). The prediction transform process may be performed by a level-of-detail (LOD) generation unit 350.

Prediction transform is a method to which the LOD transform technique is applied, and the LOD generation unit 350 may calculate and set the LOD value of each point based on the LOD distance value of each point. Points with the lowest LOD may be sparsely distributed, and points with the highest LOD may be densely distributed. That is, as the LOD increases, the interval (or distance) between points may become shorter.

Each point existing in the point cloud may be separated by LOD, and the configuration of points for each LOD may include points belonging to an LOD lower than the corresponding LOD value. For example, a configuration of points with LOD level 2 may include all points belonging to LOD level 1 and LOD level 2. Points may be reordered by LOD, with higher LODs containing points belonging to lower LODs.

The LOD generation unit 350 may generate a predictor for each point for prediction transform. Accordingly, when there are N points, N predictors may be generated. The predictor may calculate and set a weight value (=I/distance) based on the LOD value for each point, the indexing information for the neighbor points, and distance values from the neighbor points. Here, the neighbor points may be points existing within a distance set for each LOD from the current point.

In addition, the predictor may multiply the attribute values of neighbor points by the 'set weight value', and set a value obtained by averaging the attribute values multiplied by the weight value as the predicted attribute value of the current point. An attribute quantization process may be performed on a residual attribute value obtained by subtracting the predicted attribute value of the current point from the attribute value of the current point.

The lifting transform process may correspond to a process of reconstructing points into a set of detail levels through the LOD generation process, like the prediction transform process. The lifting transform process may be performed by the lifting unit 355. The lifting transform process may also include a process of generating a predictor for each point, a process of setting the calculated LOD in the predictor, a process of registering neighbor points, and a process of setting a weight according to distances between the current point and the neighbor points.

The RAHT transform process may correspond to a method of predicting attribute information of nodes at a higher level using attribute information associated with a node at a lower level of the octree. That is, the RATH transform process may correspond to an attribute information intra coding method through octree backward scan. The RAHT transform process may be performed by the RAHT transform unit 345.

The RAHT transform unit 345 scans the entire area in the voxel, and may perform the RAHT transform process up to the root node while summing (merging) the voxel into a larger block at each step. Since the RAHT transform unit 345 performs a RAHT transform process only on an occupied node, in the case of an empty node that is not occupied, the RAHT transform process may be performed on a node at a higher level immediately above it.

The attribute quantization process may correspond to a process of quantizing the attribute output from the RAHT transform unit 345, the LOD generation unit 350, and/or the lifting unit 355. The attribute quantization process may be performed by the attribute quantization unit 360. The attribute encoding process may correspond to a process of encoding a quantized attribute and outputting an attribute bitstream. The attribute encoding process may be performed by the attribute encoding unit 365.

For example, when the predicted attribute value of the current point is calculated from the LOD generation unit 350, the attribute quantization unit 36) may quantize a residual attribute value obtained by subtracting the predicted attribute value of the current point from the attribute value of the current point.

If neighboring points do not exist in the prediction unit of each point, the attribute encoding unit 365 may directly entropy code the attribute value (unquantized attribute value) of the current point. In contrast, when neighboring points exist in the prediction unit of the current points, the attribute encoding unit 365 may entropy encode the quantized residual attribute value.

As another example, when the lifting unit 360 outputs an attribute value updated through the lift update process multiplied by the weight updated through the lift prediction process (stored in QW), the attribute quantization unit 360 may quantize the result (the value obtained by multiplication), and the attribute encoding unit 365 may entropy encode the quantized value.

Overview of Point Cloud Decoding Apparatus

Figure 4:
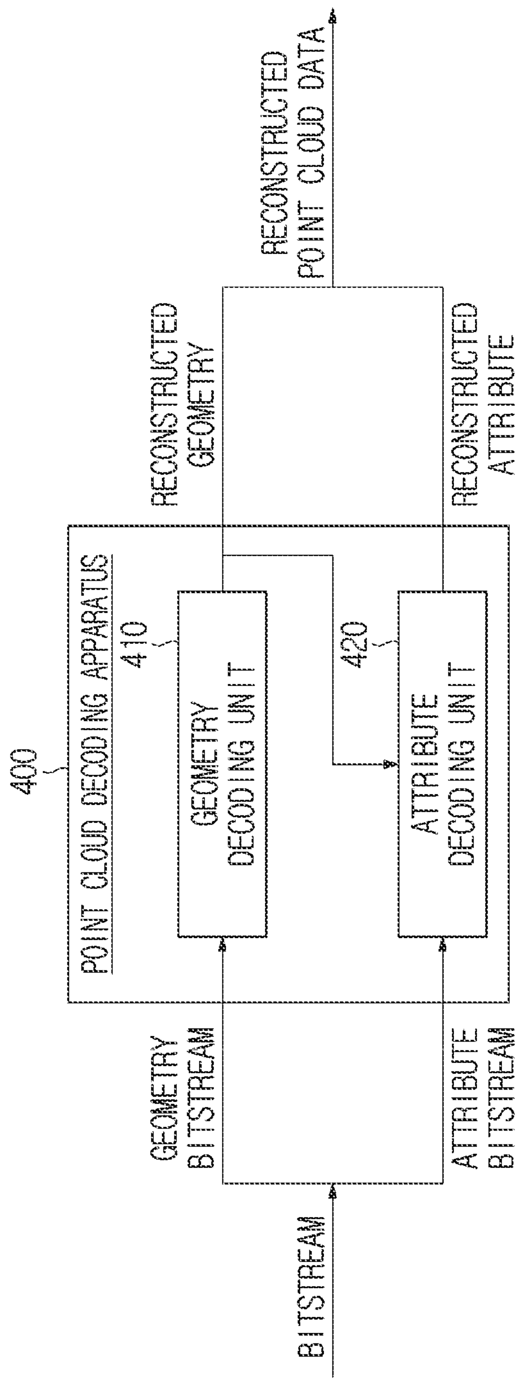
FIG. 4 is a block diagram illustrating an example of a point cloud decoding apparatus according to embodiments of the present disclosure.

FIG. 4 illustrates an example of a point cloud decoding apparatus 400 according to an embodiment of the present disclosure. The point cloud decoding apparatus 400 of FIG. 4 may correspond to the decoding unit 23 of FIG. 1 in terms of configuration and function.

The point cloud decoding apparatus 400 may perform a decoding process based on data (bitstream) transmitted from the transmission device 10. The decoding process may include a process of reconstructing (decoding) a point cloud video by performing operation corresponding to the above-described encoding operation on the bitstream.

As illustrated in FIG. 4, the decoding process may include a geometry decoding process and an attribute decoding process. The geometry decoding process may be performed by a geometry decoding unit 410, and an attribute decoding process may be performed by an attribute decoding unit 420. That is, the point cloud decoding apparatus 400 may include the geometry decoding unit 410 and the attribute decoding unit 420.

The geometry decoding unit 410 may reconstruct geometry from a geometry bitstream, and the attribute decoder 420 may reconstruct attribute based on the reconstructed geometry and the attribute bitstream. Also, the point cloud decoding apparatus 400 may reconstruct a three-dimensional point cloud video (point cloud data) based on position information according to the reconstructed geometry and attribute information according to the reconstructed attribute.

Figure 5:
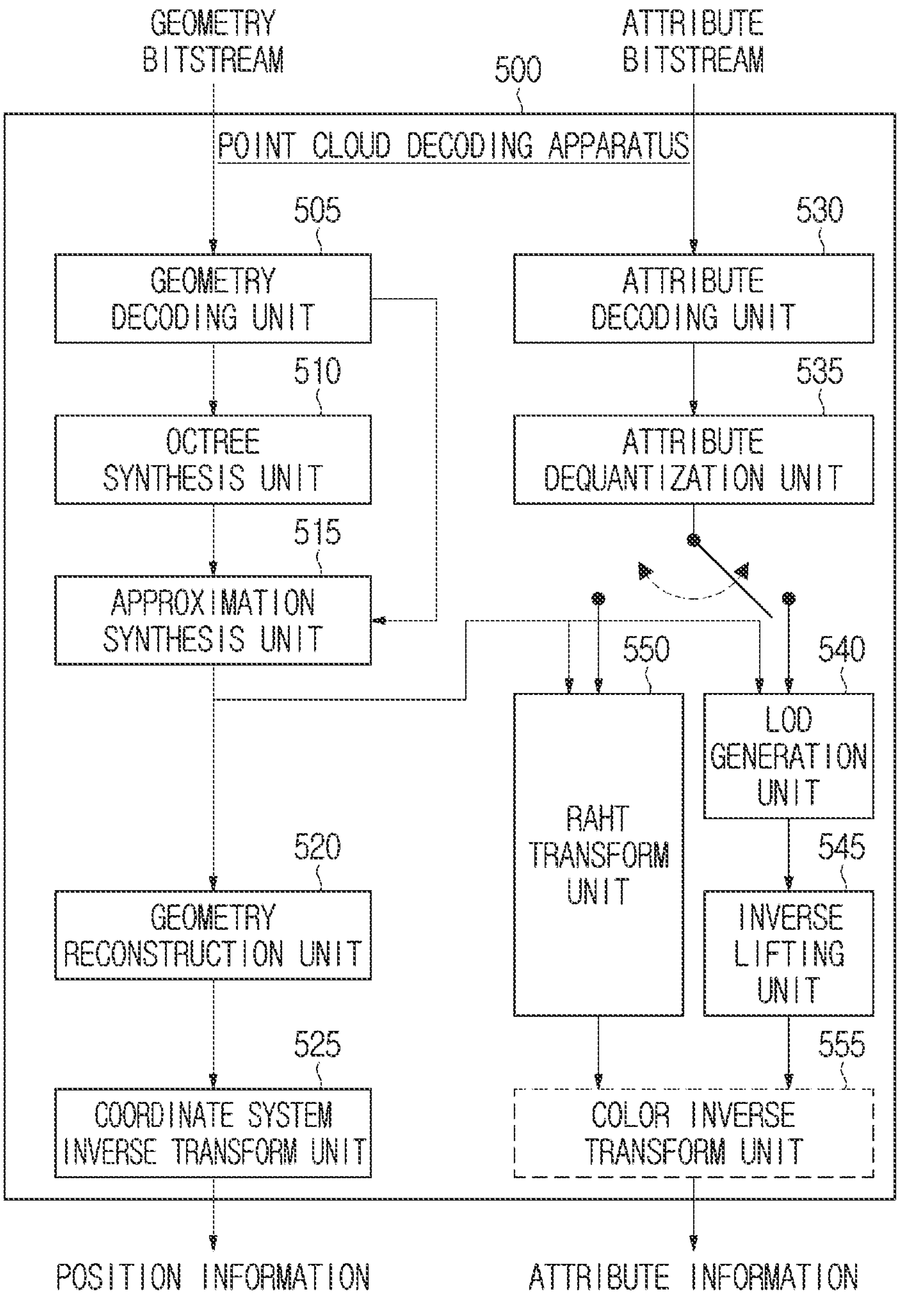
FIG. 5 is a block diagram illustrating another example of a point cloud decoding apparatus according to embodiments of the present disclosure.

FIG. 5 illustrates a specific example of a point cloud decoding apparatus 500 according to another embodiment of the present disclosure. As illustrated in FIG. 5, the point cloud decoding apparatus 500 includes a geometry decoding unit 505, an octree synthesis unit 510, an approximation synthesis unit 515, a geometry reconstruction unit 520, and a coordinate system inverse transform unit 525, an attribute decoding unit 530, an attribute inverse quantization unit 535, a RATH transform unit 550, an LOD generation unit 540, an inverse lifting unit 545, and/or a color inverse transform unit 555.

The geometry decoding unit 505, the octree synthesis unit 510, the approximation synthesis unit 515, the geometry reconstruction unit 520 and the coordinate system inverse transform unit 550 may perform geometry decoding. Geometry decoding may be performed as a reverse process of the geometry coding described with reference to FIGS. 1 to 3. Geometry decoding may include direct coding and trisoup geometry decoding. Direct coding and trisoup geometry decoding may be selectively applied.

The geometry decoding unit 505 may decode the received geometry bitstream based on arithmetic coding. Operation of the geometry decoding unit 505 may correspond to a reverse process of operation performed by the geometry encoding unit 325.

The octree synthesis unit 510 may generate an octree by obtaining an occupancy code from the decoded geometry bitstream (or information on a geometry obtained as a result of decoding). Operation of the octree synthesis unit 510 may correspond to a reverse process of operation performed by the octree analysis unit 515.

The approximation synthesis unit 515 may synthesize a surface based on the decoded geometry and/or the generated octree, when trisoup geometry encoding is applied.

The geometry reconstruction unit 520 may reconstruct geometry based on the surface and the decoded geometry. When direct coding is applied, the geometry reconstruction unit 520 may directly bring and add position information of points to which direct coding is applied. In addition, when trisoup geometry encoding is applied, the geometry reconstruction unit 520 may reconstruct the geometry by performing reconstruction operation, for example, triangle reconstruction, up-sampling, voxelization operation and the like. The reconstructed geometry may include a point cloud picture or frame that does not include attributes.

The coordinate system inverse transform unit 550 may acquire positions of points by transforming the coordinate system based on the reconstructed geometry. For example, the coordinate system inverse transform unit 550 may inversely transform the positions of points from a three-dimensional space (e.g., a three-dimensional space expressed by the coordinate system of X-axis, Y-axis, and Z-axis, etc.) to position information of the global space coordinate system.

The attribute decoding unit 530, the attribute inverse quantization unit 535, the RATH transform unit 530, the LOD generator 540, the inverse lifting unit 545 and/or the color inverse transform unit 550 may perform attribute decoding. Attribute decoding may include RAHT transform decoding, predictive transform decoding, and lifting transform decoding. The above three types of decoding may be selectively used, or a combination of one or more types of decoding may be used.

The attribute decoding unit 530 may decode an attribute bitstream based on arithmetic coding. For example, when there is no neighbor point in the predictor of each point and thus the attribute value of the current point is directly entropy-encoded, the attribute decoding unit 530 may decode the attribute value (non-quantized attribute value) of the current point. As another example, when there are neighbor points in the predictor of the current points and thus the quantized residual attribute value is entropy-encoded, the attribute decoding unit 530 may decode the quantized residual attribute value.

The attribute inverse quantization unit 535 may dequantize the decoded attribute bitstream or information on the attribute obtained as a result of decoding, and output dequantized attributes (or attribute values). For example, when the quantized residual attribute value is output from the attribute decoding unit 530, the attribute inverse quantization unit 535 may dequantize the quantized residual attribute value to output the residual attribute value. The dequantization process may be selectively applied based on whether the attribute is encoded in the point cloud encoding apparatus 300. That is, when there is no neighbor point in the predictor of each point and thus the attribute value of the current point is directly encoded, the attribute decoding unit 530 may output the attribute value of the current point that is not quantized, and the attribute encoding process may be skipped.

The RATH transform unit 550, the LOD generation unit 540, and/or the inverse lifting unit 545 may process the reconstructed geometry and dequantized attributes. The RATH transform unit 550, the LOD generation unit 540, and/or the inverse lifting unit 545 may selectively perform decoding operation corresponding to the encoding operation of the point cloud encoding apparatus 300.

The color inverse transform unit 555 may perform inverse transform coding for inverse transforming s color value (or texture) included in the decoded attributes. Operation of the inverse color transform unit 555 may be selectively performed based on whether the color transform unit 335 operates.

Figure 6:
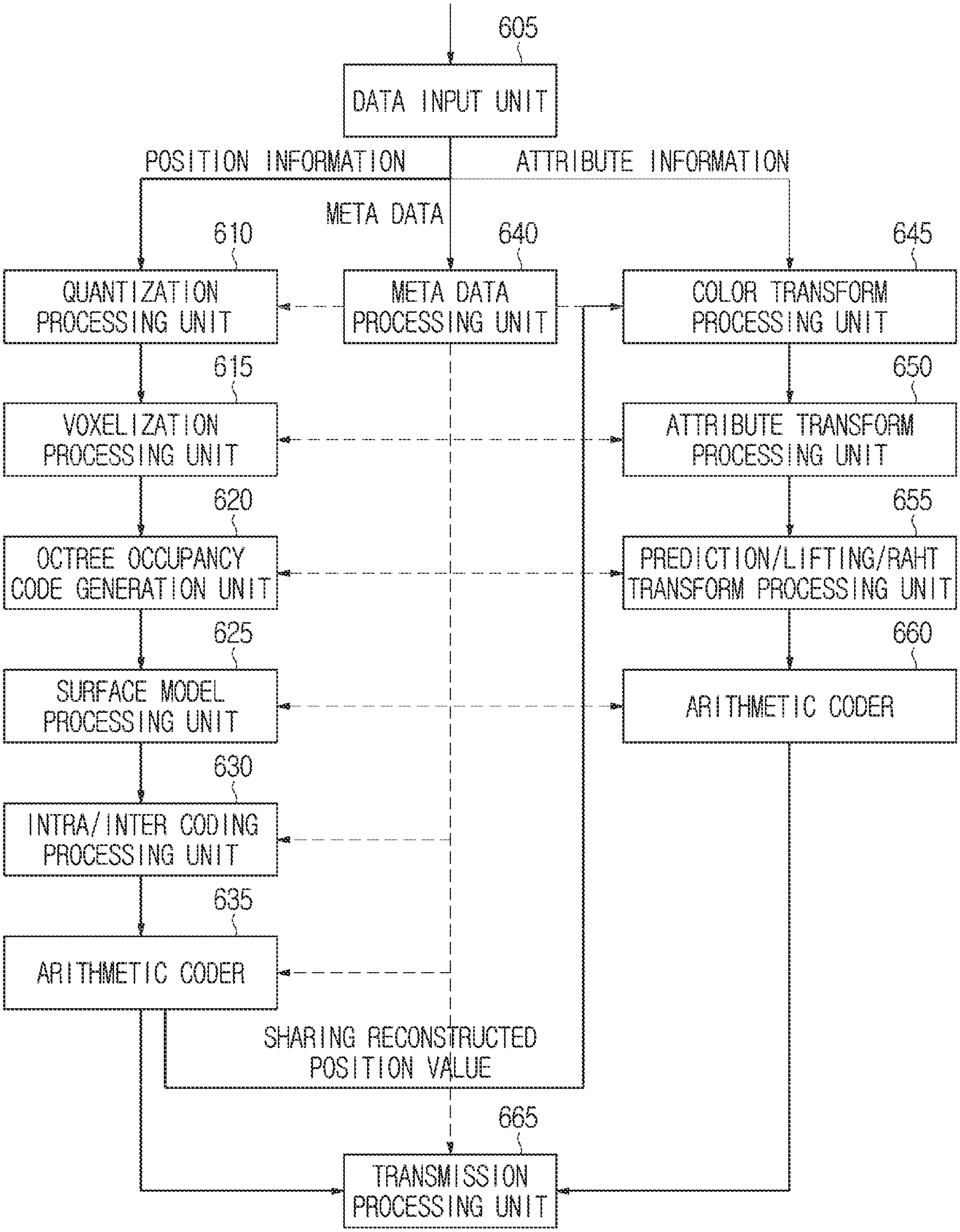
FIG. 6 is a block diagram showing another example of a transmission device according to embodiments of the present disclosure.

FIG. 6 shows another example of a transmission device according to embodiments of the present disclosure. As illustrated in FIG. 6, the transmission device may include a data input unit 605, a quantization processing unit 610, a voxelization processing unit 615, an octree occupancy code generation unit 620, a surface model processing unit 625, an intra/inter coding processing unit 630, an arithmetic coder 635, a meta data processing unit 640, a color transform processing unit 645, an attribute transform processing unit 650, a prediction/lifting/RAHT transform processing unit 655, an arithmetic coder 660 and a transmission processing unit 665.

The function of the data input unit 605 may correspond to the acquisition process performed by the acquisition unit 11 of FIG. 1. That is, the data input unit 605 may obtain a point cloud video and generate point cloud data for a plurality of points. Geometry information (position information) in the point cloud data is generated in the form of a geometry bitstream through the quantization processing unit 610, the voxelization processing unit 615, the octree occupancy code generation unit 620, the surface model processing unit 625, the intra/inter coding processing unit 630, and the arithmetic coder 635. Attribute information in the point cloud data may be generated in the form of an attribute bitstream through the color transform processing unit 645, the attribute transform processing unit 650, the prediction/lifting/RAHT transform processing unit 655, and the arithmetic coder 660. The geometry bitstream, attribute bitstream, and/or meta data bitstream may be transmitted to the reception device through processing by the transmission processing unit 665.

Specifically, the function of the quantization processing unit 610 may correspond to the quantization process performed by the geometry quantization unit 310 and/or the function of the coordinate system transform unit 305 of FIG. 3. The function of the voxelization processing unit 615 may correspond to the voxelization process performed by the geometry quantization unit 310 of FIG. 3, and the function of the octree occupancy code generation unit 620 may correspond to the function performed by the octree analysis unit 315 of FIG. 3. The function of the surface model processing unit 625 may correspond to the function performed by the approximation unit 320 of FIG. 3, and the function of the intra/inter coding processing unit 630 and the function of the arithmetic coder 635 may correspond to the function performed by the geometry encoding unit 325. The function of the meta data processing unit 640 may correspond to the function of the meta data processing unit described in FIG. 1.

Additionally, the function of the color transform processing unit 645 may correspond to the function performed by the color transform unit 335 of FIG. 3, and the function of the attribute transform processing unit 650 may correspond to the function performed by the attribute transform unit 340 of FIG. 3. The function of the prediction/lifting/RAHT transform processing unit 655 may correspond to the function performed by the RAHT transform unit 345, the LOD generation unit 350, and the lifting unit 355 of FIG. 3, and the function of the arithmetic coder 660 may correspond to the function of the attribute encoding unit 365 of FIG. 3. The function of the transmission processing unit 665 may correspond to the function performed by the transmission unit 14 and/or the encapsulation processing unit 13 of FIG. 1.

Figure 7:
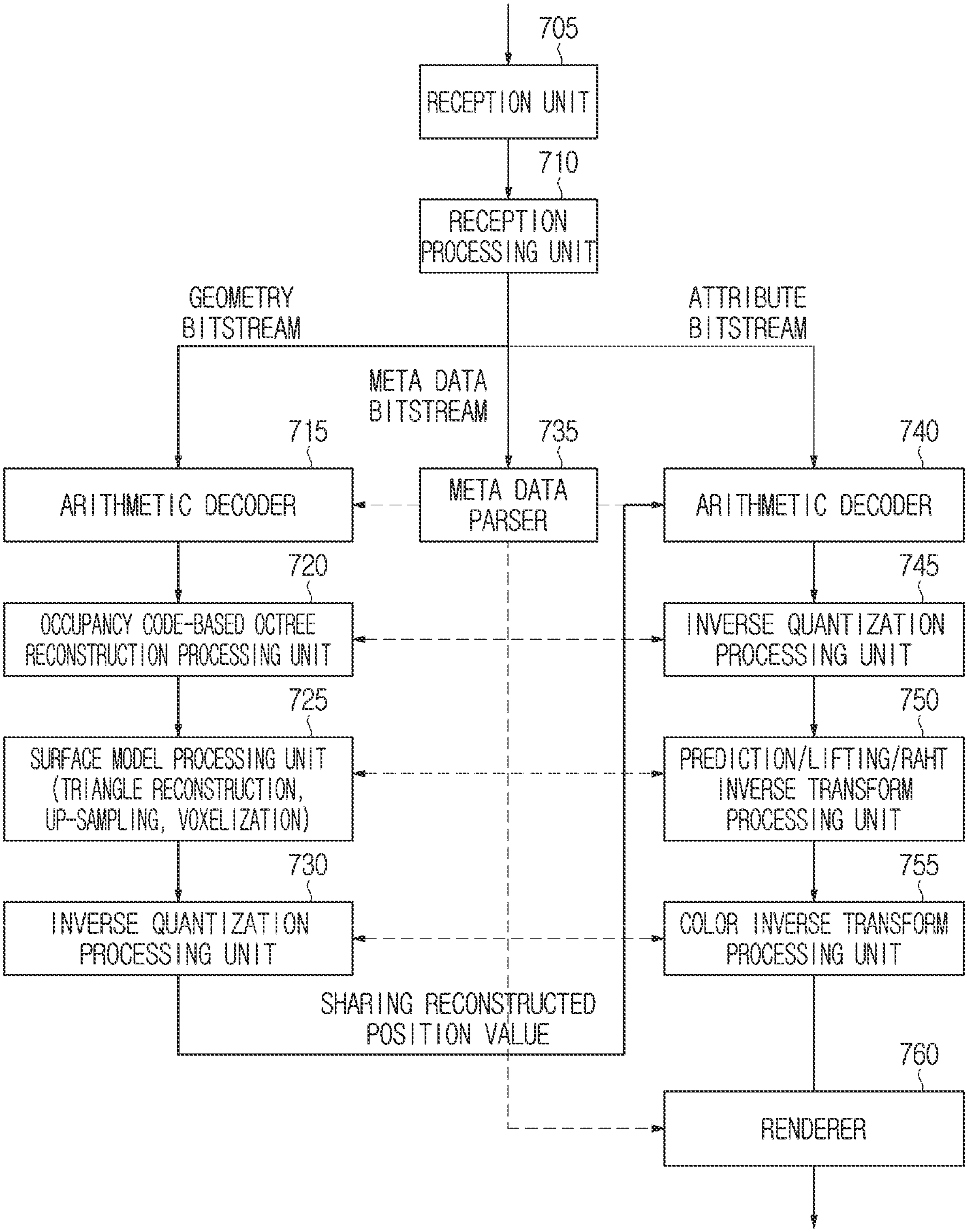
FIG. 7 is a block diagram showing another example of a reception device according to embodiments of the present disclosure.

FIG. 7 shows another example of a reception device according to embodiments of the present disclosure. As illustrated in FIG. 7, the reception device may include a reception unit 705, a reception processing unit 710, an arithmetic decoder 715, a meta data parser 735, an occupancy code-based octree reconstruction processing unit 720, a surface model processing unit 725, an inverse quantization processing unit 730, an arithmetic decoder 740, an inverse quantization processing unit 745, a prediction/lifting/RAHT inverse transform processing unit 750, a color inverse transform processing unit 755, and a renderer 760.

The function of the reception unit 705 may correspond to the function performed by the reception unit 21 of FIG. 1, and the function of the reception processing unit 710 may correspond to the function performed by the decapsulation processing unit 22 of FIG. 1. That is, the reception unit 705 may receive a bitstream from the transmission processing unit 765, and the reception processing unit 710 may extract a geometry bitstream, an attribute bitstream, and/or a meta data bitstream through decapsulation processing. The geometry bitstream may be generated as reconstructed (restored) position value (position information) through the arithmetic decoder 715, the occupancy code-based octree reconstruction processing unit 720, the surface model processing unit 725, and the inverse quantization processing unit 730. The attribute bitstream may be generated as the restored attribute value through the arithmetic decoder 740, the inverse quantization processing unit 745, the prediction/lifting/RAHT inversion processing unit 750, and the color inverse transform processing unit 755. The meta data bitstream may be generated as restored meta data (or meta data information) through the meta data parser 735. The position value, the attribute value, and/or the meta data may be rendered in the renderer 760 to provide experiences such as VR/AR/MR/ autonomous driving to the user.

Specifically, the function of the arithmetic decoder 715 may correspond to the function performed by the geometry decoding unit 505 of FIG. 5, and the function of the occupancy code-based octree reconstruction processing unit 720 may correspond to the function of the octree synthesis unit 510 of FIG. 5. The function of the surface model processing unit 725 may correspond to the function performed by the approximation synthesis unit of FIG. 5, and the function of the inverse quantization processing unit 730 may correspond to the function performed by the geometry reconstruction unit 520 and/or the coordinate system inverse transform unit 525 of FIG. 5. The function of the meta data parser 735 may correspond to the function performed by the metadata parsing unit described in FIG. 1.

Additionally, the function of the arithmetic decoder 740 may correspond to the function performed by the attribute decoding unit 530 of FIG. 5, and the function of the inverse quantization processing 745 may correspond to the function of the attribute inverse quantization unit 535 of FIG. 5. The function of the prediction/lifting/RAHT inverse transform processing unit 750 may correspond to the function performed by the RAHT transform unit 550, the LOD generation unit 540, and the inverse lifting unit 545 of FIG. 5, and the color inverse transform processing unit 755 may correspond to the function performed by the color inverse transform unit 555 of FIG. 5.

Figure 8:
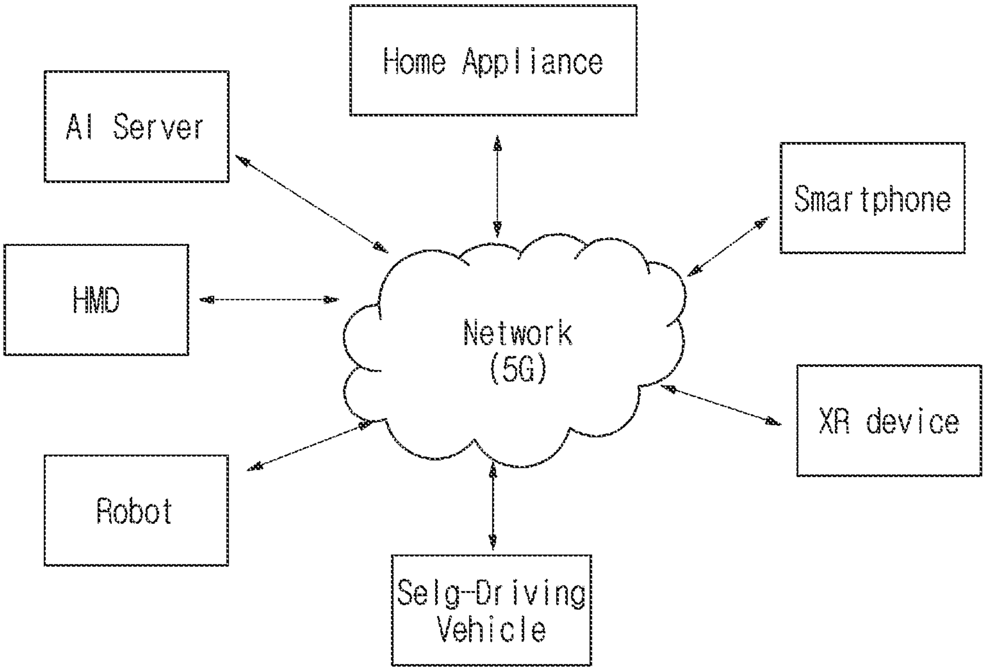
FIG. 8 is a diagram illustrating an example of a structure interworking with a point cloud data transmission/reception method/apparatus according to embodiments of the present disclosure.

FIG. 8 illustrates an example of a structure capable of interworking with a method/device for transmitting and receiving point cloud data according to embodiments of the present disclosure.

The structure of FIG. 8 illustrates a configuration in which at least one of a server (AI Server), a robot, a self-driving vehicle, an XR device, a smartphone, a home appliance and/or a HMD is connected to a cloud network. The robot, the self-driving vehicle, the XR device, the smartphone, or the home appliance may be referred to as a device. In addition, the XR device may correspond to a point cloud data device (PCC) according to embodiments or may interwork with the PCC device.

The cloud network may refer to a network that forms part of the cloud computing infrastructure or exists within the cloud computing infrastructure. Here, the cloud network may be configured using a 3G network, a 4G or Long Term Evolution (LTE) network, or a 5G network.

The server may be connected to at least one of the robot, the self-driving vehicle, the XR device, the smartphone, the home appliance, and/or the HMD through a cloud network, and may help at least a part of processing of the connected devices.

The HMD may represent one of the types in which an XR device and/or the PCC device according to embodiments may be implemented. The HMD type device according to the embodiments may include a communication unit, a control unit, a memory unit, an I/O unit, a sensor unit, and a power supply unit.

<PCC+XR>

The XR/PCC device may be implemented by a HMD, a HUD provided in a vehicle, a TV, a mobile phone, a smartphone, a computer, a wearable device, a home appliance, a digital signage, a vehicle, a fixed robot or a mobile robot, etc., by applying PCC and/or XR technology.

The XR/PCC device may obtain information on a surrounding space or a real object by analyzing 3D point cloud data or image data acquired through various sensors or from an external device to generate position (geometric) data and attribute data for 3D points, and render and output an XR object to be output. For example, the XR/PCC device may output an XR object including additional information on the recognized object in correspondence with the recognized object.

<PCC+XR+Mobile Phone>

The XR/PCC device may be implemented by a mobile phone or the like by applying PCC technology. A mobile phone can decode and display point cloud content based on PCC technology.

<PCC+Self-Driving+XR>

The self-driving vehicle may be implemented by a mobile robot, a vehicle, an unmanned aerial vehicle, etc. by applying PCC technology and XR technology. The self-driving vehicle to which the XR/PCC technology is applied may mean a self-driving vehicle equipped with a unit for providing an XR image or a self-driving vehicle which is subjected to control/interaction within the XR image. In particular, the self-driving vehicle which is subjected to control/interaction within the XR image is distinguished from the XR device and may be interwork with each other.

The self-driving vehicle equipped with a unit for providing an XR/PCC image may acquire sensor information from sensors including a camera, and output an XR/PCC image generated based on the acquired sensor information. For example, the self-driving vehicle has a HUD and may provide a passenger with an XR/PCC object corresponding to a real object or an object in a screen by outputting an XR/PCC image.

In this case, when the XR/PCC object is output to the HUD, at least a portion of the XR/PCC object may be output so as to overlap an actual object to which a passenger's gaze is directed. On the other hand, when the XR/PCC object is output to a display provided inside the self-driving vehicle, at least a portion of the XR/PCC object may be output to overlap the object in the screen. For example, the self-driving vehicle may output XR/PCC objects corresponding to objects such as a lane, other vehicles, traffic lights, traffic signs, two-wheeled vehicles, pedestrians, and buildings.

The VR technology, AR technology, MR technology, and/or PCC technology according to the embodiments are applicable to various devices. That is, VR technology is display technology that provides objects or backgrounds in the real world only as CG images. On the other hand, AR technology refers to technology that shows a virtual CG image on top of an actual object image. Furthermore, MR technology is similar to AR technology described above in that a mixture and combination of virtual objects in the real world is shown. However, in AR technology, the distinction between real objects and virtual objects made of CG images is clear, and virtual objects are used in a form that complements the real objects, whereas, in MR technology, virtual objects are regarded as equivalent to real objects unlike the AR technology. More specifically, for example, applying the MR technology described above is a hologram service. VR, AR and MR technologies may be integrated and referred to as XR technology.

Space Partition

Point cloud data (i.e., G-PCC data) may represent volumetric encoding of a point cloud consisting of a sequence of frames (point cloud frames). Each point cloud frame may include the number of points, the positions of the points, and the attributes of the points. The number of points, the positions of the points, and the attributes of the points may vary from frame to frame. Each point cloud frame may mean a set of three-dimensional points specified by zero or more attributes and Cartesian coordinates (x, y, z) of three-dimensional points in a particular time instance. Here, the Cartesian coordinates (x, y, z) of the three-dimensional points may be a position or a geometry.

In some embodiments, the present disclosure may further perform a space partition process of partitioning the point cloud data into one or more 3D blocks before encoding the point cloud data. The 3D block may mean whole or part of a 3D space occupied by the point cloud data. The 3D block may be one or more of a tile group, a tile, a slice, a coding unit (CU), a prediction unit (PU), or a transform unit (TU).

A tile corresponding to a 3D block may mean whole or part of the 3D space occupied by the point cloud data. Also, a slice corresponding to a 3D block may mean whole or part of a 3D space occupied by the point cloud data. A tile may be partitioned into one or more slices based on the number of points included in one tile. A tile may be a group of slices with bounding box information. The bounding box information of each tile may be specified in a tile inventory (or a tile parameter set, a tile parameter set (TPS)). A tile may overlap another tile in the bounding box. A slice may be a unit of data on which encoding is independently performed, or a unit of data on which decoding is independently performed. That is, a slice may be a set of points that may be independently encoded or decoded. In some embodiments, a slice may be a series of syntax elements representing part or whole of a coded point cloud frame. Each slice may include an index for identifying a tile to which the slice belongs.

The spatially partitioned 3D blocks may be processed independently or non-independently. For example, spatially partitioned 3D blocks may be encoded or decoded independently or non-independently, respectively, and may be transmitted or received independently or non-independently, respectively. In addition, the spatially partitioned 3D blocks may be quantized or dequantized independently or non-independently, and may be transformed or inversely transformed independently or non-independently, respectively. In addition, spatially partitioned 3D blocks may be rendered independently or non-independently. For example, encoding or decoding may be performed in units of slices or units of tiles. In addition, quantization or dequantization may be performed differently for each tile or slice, and may be performed differently for each transformed or inversely transformed tile or slice.

In this way, when the point cloud data is spatially partitioned into one or more 3D blocks and the spatially partitioned 3D blocks are processed independently or non-independently, the process of processing the 3D blocks is performed in real time and the process is performed with low latency. In addition, random access and parallel encoding or parallel decoding in a three-dimensional space occupied by point cloud data may be enabled, and errors accumulated in the encoding or decoding process may be prevented.

Figure 9:
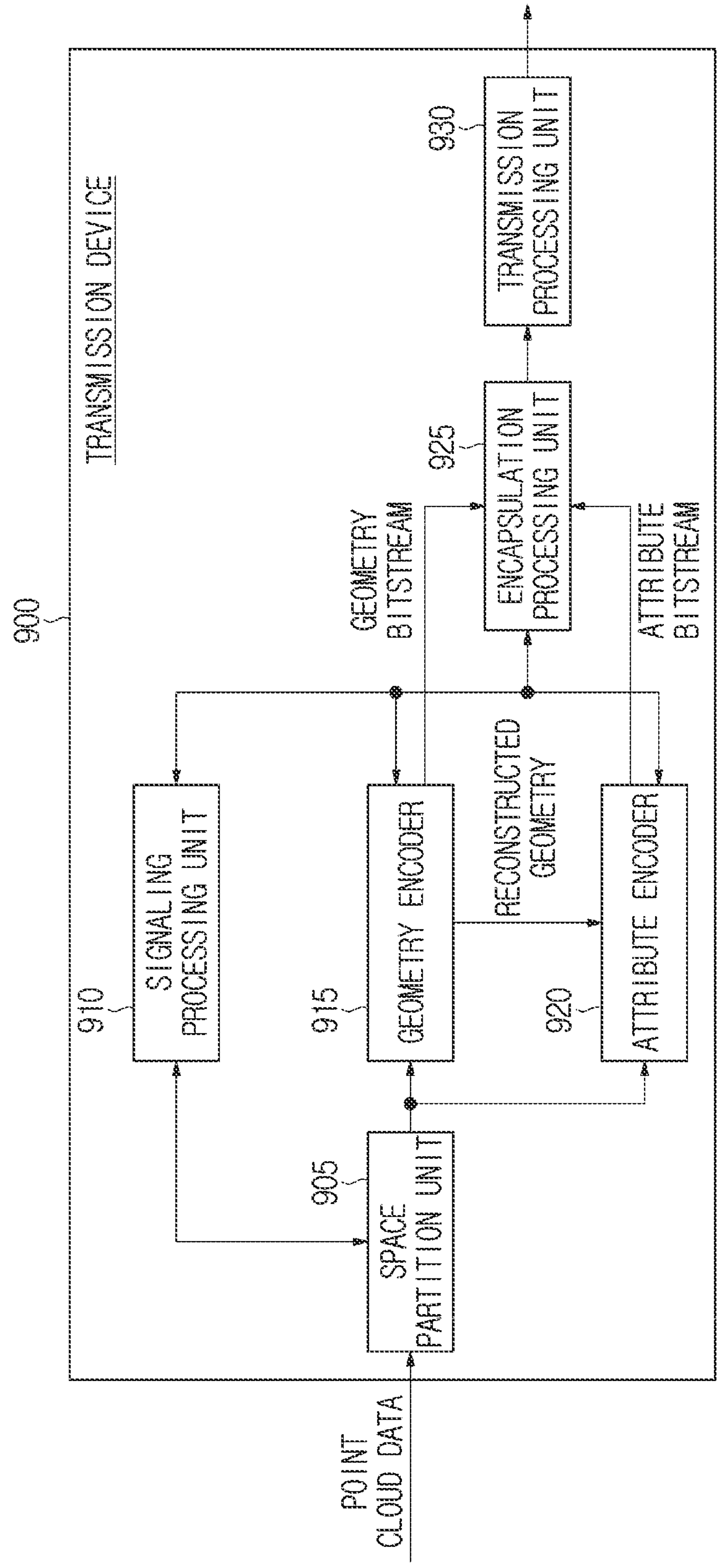
FIG. 9 is a block diagram illustrating another example of a transmission device according to embodiments of the present disclosure.

FIG. 9 is a block diagram illustrating an example of a transmission device 900 for performing a space partition process according to embodiments of the present disclosure. As illustrated in FIG. 9, the transmission device 900 may include a space partition unit 905 for performing a space partition process, a signaling processing unit 910, a geometry encoder 915, an attribute encoder 920, and an encapsulation processing unit 925 and/or a transmission processing unit 930.

The space partition unit 905 may perform a space partition process of partitioning the point cloud data into one or more 3D blocks based on a bounding box and/or a sub-bounding box. Through the space partition process, point cloud data may be partitioned into one or more tiles and/or one or more slices. In some embodiments, the point cloud data may be partitioned into one or more tiles, and each partitioned tile may be further partitioned into one or more slices, through a space partition process.

Figure 10:
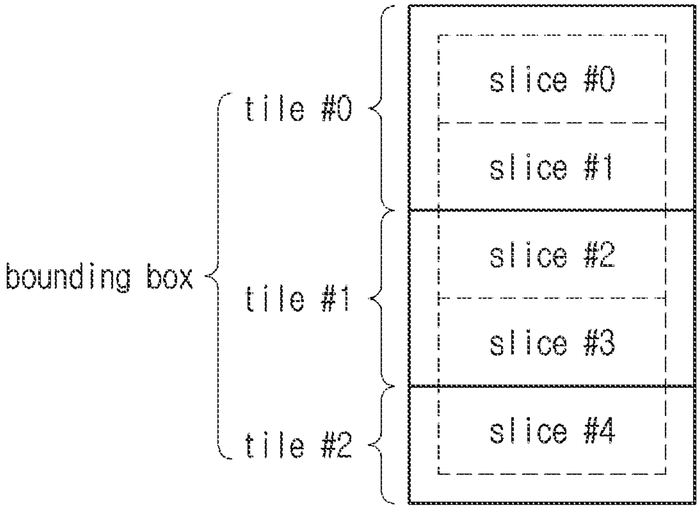
FIG. 10 shows an example of spatial partitioning a bounding box into 3D blocks according to embodiments of the present disclosure.

FIG. 10 shows an example of spatially partitioning a bounding box (i.e., point cloud data) into one or more 3D blocks. As illustrated in FIG. 10, the overall bounding box of the point cloud data may be partitioned into three tiles: tile #0, tile #1, and tile #2. Additionally, tile #0 may be further partitioned into two slices, namely slice #0 and slice #1. Additionally, tile #1 may be further partitioned into two slices, namely slice #2 and slice #3. Additionally, tile #2 may be further partitioned into slice #4.

The signaling processing unit 910 may generate and/or process (e.g., entropy-encode) signaling information and output it in the form of a bitstream. Hereinafter, a bitstream (in which signaling information is encoded) output from the signaling processing unit is referred to as a 'signaling bitstream'. The signaling information may include information for space partition or information on space partition. That is, the signaling information may include information related to the space partition process performed by the space partition unit 905.

When the point cloud data is partitioned into one or more 3D blocks, information for decoding some point cloud data corresponding to a specific tile or a specific slice among the point cloud data may be required. In addition, in order to support spatial access (or partial access) to point cloud data, information related to 3D spatial areas may be required. Here, the spatial access may mean extracting, from a file, only necessary partial point cloud data in the entire point cloud data. The signaling information may include information for decoding some point cloud data, information related to 3D spatial areas for supporting spatial access, and the like. For example, the signaling information may include 3D bounding box information, 3D spatial area information, tile information, and/or tile inventory information.

The signaling information may be provided from the space partition unit 905, the geometry encoder 915, the attribute encoder 920, the transmission processing unit 925, and/or the encapsulation processing unit 930. In addition, the signaling processing unit 910 may provide the feedback information fed back from the reception device 900 of FIG. 13 to the space partition unit 905, the geometry encoder 915, the attribute encoder 920, the transmission processing unit 925 and/or the encapsulation processing unit 930.

The signaling information may be stored and signaled in a sample in a track, a sample entry, a sample group, a track group, or a separate metadata track. In some embodiments, the signaling information may be signaled in units of sequence parameter sets (SPSs) for signaling of a sequence level, geometry parameter sets (GPSs) for signaling of geometry coding information, and attribute parameter sets (APSs) for signaling of attribute coding information, tile parameter sets (TPSs) (or tile inventory) for signaling of a tile level, etc. In addition, the signaling information may be signaled in units of coding units such as slices or tiles.

Meanwhile, positions (position information) of the 3D blocks may be output to the geometry encoder 915, and attributes (attribute information) of the 3D blocks may be output to the attribute encoder 920.

The geometry encoder 915 may construct an octree based on the position information, encode the constructed octree, and output a geometry bitstream. Also, the geometry encoder 915 may reconstruct the octree and/or the approximated octree and output it to the attribute encoder 920. The reconstructed octree may be reconstructed geometry. The geometry encoder 915 may perform all or some of operations performed by the coordinate system transform unit 305, the geometry quantization unit 310, the octree analysis unit 315, the approximation unit 320, the geometry encoding unit 325 and/or the reconstruction unit 330 of FIG. 3. In some embodiments, the geometry encoder 915 may perform all or part of operations performed by the quantization processing unit 610, the voxelization processing unit 615, the octree occupancy code generation unit 620, the surface model processing unit 625, the intra/inter coding processing unit 630 and/or the arithmetic coder 635.

The attribute encoder 920 may output an attribute bitstream by encoding an attribute based on the reconstructed geometry. The attribute encoder 920 may perform all or some of operations performed by the attribute transform unit 340, the RAHT transform unit 345, the LOD generation unit 350, the lifting unit 355, the attribute quantization unit 360, the attribute encoding unit 365 and/or the color transform nit 335 of FIG. 3. In some embodiments, the attribute encoder 920 may perform all or part of operations performed by the attribute transform processing unit 650, the prediction/lifting/RAHT transform processing unit 655, the arithmetic coder 660, and/or the color transform processing unit 645 of FIG. 6.

The encapsulation processing unit 925 may encapsulate one or more input bitstreams into a file or segment. For example, the encapsulation processing unit 925 may encapsulate each of the geometry bitstream, the attribute bitstream, and the signaling bitstream, or multiplex and encapsulate the geometry bitstream, the attribute bitstream, and the signaling bitstream. In some embodiments, the encapsulation processing unit 925 may encapsulate a bitstream (G-PCC bitstream) consisting of a sequence of a type-length-value (TLV) structure into a file. TLV (or TLV encapsulation) structures constituting the G-PCC bitstream may include a geometry bitstream, an attribute bitstream, a signaling bitstream, and the like. In some embodiments, the G-PCC bitstream may be generated by the encapsulation processing unit 925 or generated by the transmission processing unit 930. In some embodiments, the encapsulation processing unit 925 may perform all or some of operations performed by the encapsulation processing unit 13 of FIG. 1.

The transmission processing unit 930 may process an encapsulated bitstream or a file/segment according to an arbitrary transport protocol. The transmission processing unit 930 may perform all or some of operations performed by the transmission unit 14 and the transmission processing unit described with reference to FIG. 1 or the transmission processing unit 665 of FIG. 6.

Figure 11:
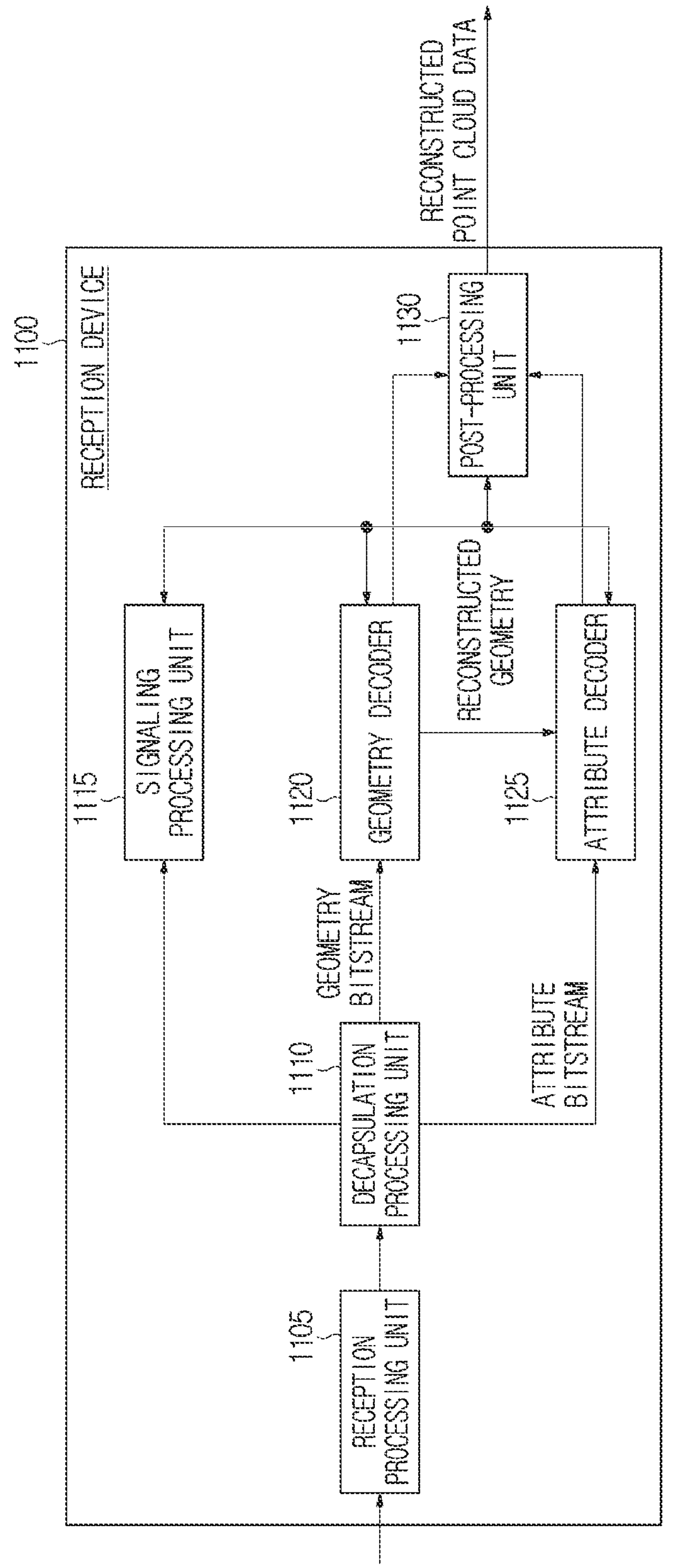
FIG. 11 is a block diagram illustrating another example of a reception device according to embodiments of the present disclosure.

FIG. 11 is a block diagram illustrating an example of a reception device 1100 according to embodiments of the present disclosure. The reception device 1100 may perform operations corresponding to the operations of the transmission device 900 for performing space partition. As illustrated in FIG. 8, the reception device 1100 may include a reception processing unit 1105, a decapsulation processing unit 1110, a signaling processing unit 1115, a geometry decoder 1120, an attribute encoder 1125, and/or a post-processing unit 1130.

The reception processing unit 1105 may receive a file/segment in which a G-PCC bitstream is encapsulated, a G-PCC bitstream, or a bitstream, and may process it according to a transport protocol. The reception processing unit 1105 may perform all or some of operations performed by the reception unit 21 and the reception processing unit described with reference to FIG. 1 or the reception unit 705 or the reception processing unit 710 of FIG. 7.

The decapsulation processing unit 1110 may obtain a G-PCC bitstream by performing a reverse process of operations performed by the encapsulation processing unit 925. The decapsulation processing unit 1110 may obtain a G-PCC bitstream by decapsulating the file/segment. For example, the decapsulation processing unit 1110 may obtain and output a signaling bitstream to the signaling processing unit 1115, obtain and output a geometry bitstream to the geometry decoder 1120, and obtain and output an attribute bitstream to the attribute decoder 1125. The decapsulation processing unit 1110 may perform all or some of operations performed by the decapsulation processing unit 22 of FIG. 1 of the reception processing unit 710 of FIG. 7.

The signaling processing unit 1115 may parse and decode signaling information by performing a reverse process of operations performed by the signaling processing unit 910. The signaling processing unit 1115 may parse and decode signaling information from a signaling bitstream. The signaling processing unit 1115 may provide the decoded signaling information to the geometry decoder 1120, the attribute decoder 1120, and/or the post-processing unit 1130.

The geometry decoder 1120 may reconstruct geometry from the geometry bitstream by performing a reverse process of operations performed by the geometry encoder 915. The geometry decoder 1120 may reconstruct geometry based on signaling information (parameters related to the geometry). The reconstructed geometry may be provided to the attribute decoder 1125.

The attribute decoder 1125 may reconstruct attribute from the attribute bitstream by performing a reverse process of the operations performed by the attribute encoder 920. The attribute decoder 1125 may reconstruct the attribute based on the signaling information (parameters related to the attribute) and the reconstructed geometry.

The post-processing unit 1130 may reconstruct point cloud data based on the reconstructed geometry and the reconstructed attribute. Reconstruction of point cloud data may be performed through a process of matching the reconstructed geometry with the reconstructed attribute. In some embodiments, when the reconstructed point cloud data is in units of tiles and/or slices, the post-processing unit 1130 may reconstruct the bounding box of the point cloud data, by performing a reverse process of the space partition process of the transmission device 900 based on signaling information. In some embodiments, when the bounding box is partitioned into a plurality of tiles and/or a plurality of slices through a space partition process, the post-processing unit 1130 may reconstruct part of the bounding box, by combining some slices and/or some tiles based on the signaling information. Here, some slices and/or some tiles used to reconstruct the bounding box may be slices and/or some tiles related to a 3D spatial area in which spatial access is desired.

Tile Inventory Syntax Structure

FIG. 12 shows an example of the syntax structure of a tile inventory. The tile inventory may be referred to as a tile parameter set (TPS). In FIG. 12, syntax elements (or fields) expressed in the syntax structure of the TPS may be syntax elements included in the TPS or syntax elements signaled through the TPS.

tile_frame_idx may include an identifying number that may be used to identify the purpose of the tile inventory. tile_seq_parameter_set_id may indicate the value of sps_seq_parameter_set_id for active SPS. tile_id_present_flag may indicate parameters for identifying tiles. For example, if the value of tile_id_present_flag is equal to a first value (e.g., 1), this may indicate that tiles are identified according to the value of the tile_id syntax element, and if the value of tile_id_present_flag is equal to a second value (e.g., 0), this may indicate that tiles are identified based on their locations in the tile inventory. tile_cnt may indicate the number of tile bounding boxes that are present in the tile inventory. tile_bounding_box_bits may indicate the bit depth for expressing bounding box information of the tile inventory. As the loop variable tileIdx increases by 1 from 0 to (number of tile bounding boxes—1), tile_id, tile_bounding_box_offset_xyz[tile_id][k], and tile_bounding_box_size_xyz[tile_id][k] may be signaled. tile_id may identify a specific tile in tile inventory. tile_id may be signaled when the value of tile_id_present_flag is a first value (e.g., 1), and may be signaled as many times as the number of tile bounding boxes. In case where tile_id is not present (not signaled), the value of tile_id may be inferred to be the index of the tile in the tile inventory provided by the loop variable tileIdx. It may be a requirement of bitstream conformance that all values of tile_id be unique within the tile inventory. tile_bounding_box_offset_xyz[tileId][k] and tile_bounding_box_size_xyz[tileId][k] and tile_bounding_box_offset_xyz[tileId][k] may indicate a bounding box containing a slice identified by gsh tile_id, which is the same as tileId. tile_bounding_box_offset_xyz[tileId][k] may be the k-th component of the (x, y, z) origin coordinates of the tile bounding box for TileOrigin[k]. tile_bounding_box_size_xyz[tileId][k] may be the k-th component of the width, height, and depth of the tile bounding box.

tile_origin_xyz[k] may be signaled as the variable k increases by 1 from 0 to 2. tile_origin_xyz[k] may indicate the k-th component of the tile origin in Cartesian coordinates. The value of tile_origin_xyz[k] shall be equal to sps_bounding_box_offset[k]. tile_origin_log 2_scale may indicate a scaling factor for scaling the components of tile_origin_xyz. The value of tile_origin_log 2_scale shall be equal to sps_bounding_box_offset_log 2_scale. For k=0, . . . , 2, the array TileOrigin with elements TileOrigin[k] may be derived as 'TileOrigin[k]=tile_origin_xyz[k]<<tile_origin_log 2_scale'.

Encapsulation/Decapsulation

The G-PCC bitstream composed of TLV encapsulation structures may be transmitted to the reception device without change, or may be encapsulated and transmitted to the reception device. For example, the encapsulation processing unit 1125 may encapsulate a G-PCC bitstream composed of TLV encapsulation structures in the form of a file/segment and transmit it. The decapsulation processing unit 1110 may acquire a G-PCC bitstream by decapsulating the encapsulated file/segment.

In some embodiments, the G-PCC bitstream may be encapsulated in an ISOBMFF-based file format. In this case, the G-PCC bitstream may be stored in a single track or multiple tracks in the ISOBMFF file. Here, the single track or multiple tracks in a file may be referred to as "tracks" or "G-PCC tracks". The ISOBMFF-based file may be referred to as a container, a container file, a media file, a G-PCC file, and the like. Specifically, the file may be composed of boxes and/or information that may be referred to as ftyp, moov, mdat, and the like.

The flyp box (file type box) may provide file type or file compatibility related information for the file. The reception device may identify the file by referring to the flyp box. The mdat box is also called a media data box and may include actual media data. In some embodiments, a geometry slice (or coded geometry bitstream) and zero or more attribute slices (or coded attribute bitstream) may be included in a sample of an mdat box in a file. Here, the sample may be referred to as a G-PCC sample. The moov box is also called a movie box, and may include metadata for media data of the file. For example, the moov box may include information necessary for decoding and playback of the media data, and may include information on tracks and samples of the file. The moov box may act as a container for all metadata. The moov box may be a box of the uppermost layer among metadata-related boxes.

In some embodiments, the moov box may include a track (trak) box providing information related to a track of a file, and the trak box may include a media (mdia) box (MediaBox) providing media information of the track, and a track reference container (tref) box for linking (referencing) the track and a sample of a file corresponding to the track. The media box MediaBox may include a media information container (minf) box that provides information on the media data and a handler (hdlr) box that indicates a stream type. The minf box may include a sample table (stbl) box that provides metadata related to a sample of the mdat box. The stbl box may include a sample description (stsd) box that provides information on a used coding type and initialization information required for the coding type. In some embodiments, a sample description (stsd) box may include a sample entry for a track. In some embodiments, signaling information (or metadata) such as SPS, GPS, APS, and tile inventory may be included in a sample entry of a moov box or a sample of an mdat box in a file.

A G-PCC track may be defined as a volumetric visual track carrying a geometry slice (or coded geometry bitstream) or attribute slice (or coded attribute bitstream), or both a geometry slice and an attribute slice. In some embodiments, the volumetric visual track may be identified by a volumetric visual media handler type 'volv' in a handler box HandlerBox of a media box (MediaBox) and/or a volumetric visual media header vvhd in a minf box of a media box MediaBox. The minf box may be referred to as a media information container or a media information box. The minf box may be included in the media box MediaBox, the media box MediaBox may be included in the track box, and the track box may be included in the moov box of the file. A single volumetric visual track or multiple volumetric visual tracks may be present in a file.

Sample Group

The encapsulation processing unit mentioned in the present disclosure may generate a sample group by grouping one or more samples. The encapsulation processing unit, the metadata processing unit, or the signaling processing unit mentioned in the present disclosure may signal signaling information associated with a sample group in a sample, a sample group, or a sample entry. That is, the sample group information associated with the sample group may be added to a sample, a sample group, or a sample entry. The sample group information may be 3D bounding box sample group information, 3D region sample group information, 3D tile sample group information, 3D tile inventory sample group information, and the like.

Track Group

The encapsulation processing unit mentioned in the present disclosure may generate a track group by grouping one or more tracks. The encapsulation processing unit, the metadata processing unit, or the signaling processing unit mentioned in the present disclosure may signal signaling information associated with a track group in a sample, a track group, or a sample entry. That is, the track group information associated with the track group may be added to a sample, track group or sample entry. The track group information may be 3D bounding box track group information, point cloud composition track group information, spatial region track group information, 3D tile track group information, 3D tile inventory track group information, and the like.

Sample Entry

FIG. 13 is a diagram for explaining an ISOBMFF-based file including a single track. (a) of FIG. 13 illustrates an example of the layout of an ISOBMFF-based file including a single track, and (b) of FIG. 13 illustrates an example of a sample structure of a mdat box when a G-PCC bitstream is stored in a single track of a file. FIG. 14 is a diagram for explaining an ISOBMFF-based file including multiple tracks. (a) of FIG. 14 illustrates an example of the layout of an ISOBMFF-based file including multiple tracks, and (b) of FIG. 14 illustrates an example of a sample structure of a mdat box when a G-PCC bitstream is stored in a single track of a file.

The stsd box (SampleDescriptionBox) included in the moov box of the file may include a sample entry for a single track storing the G-PCC bitstream. The SPS, GPS, APS, tile inventory may be included in a sample entry in a moov box or a sample in an mdat box in a file. Also, geometry slices and zero or more attribute slices may be included in the sample of the mdat box in the file. When a G-PCC bitstream is stored in a single track of a file, each sample may contain multiple G-PCC components. That is, each sample may be composed of one or more TLV encapsulation structures.

As illustrated in (b) of FIG. 14, the sample may include TLV encapsulation structures including a geometry slice. In addition, a sample may include TLV encapsulation structures including one or more parameter sets. In addition, a sample may include TLV encapsulation structures including one or more attribute slices.

As illustrated in (a) of FIG. 14, when a G-PCC bitstream is carried by multiple tracks of an ISOBMFF-based file, each geometry slice or attribute slice may be mapped to an individual track. For example, a geometry slice may be mapped to track 1, and an attribute slice may be mapped to track 2. The track (track 1) carrying the geometry slice may be referred to as a geometry track or a G-PCC geometry track, and the track (track 2) carrying the attribute slice may be referred to as an attribute track or a G-PCC attribute track. In addition, the geometry track may be defined as a volumetric visual track carrying a geometry slice, and the attribute track may be defined as a volumetric visual track carrying an attribute slice.

A track carrying part of a G-PCC bitstream including both a geometry slice and an attribute slice may be referred to as a multiplexed track. In the case where the geometry slice and attribute slice are stored on separate tracks, each sample in the track may include at least one TLV encapsulation structure carrying data of a single G-PCC component. In this case, each sample contains neither geometry nor attributes, and may not contain multiple attributes. Multi-track encapsulation of a G-PCC bitstream may enable a G-PCC player to effectively access one of the G-PCC components.

Temporal Scalability

Temporal scalability may refer to a function that allows the possibility of extracting one or more subsets of independently coded frames. Also, temporal scalability may refer to a function of dividing G-PCC data into a plurality of different temporal levels and independently processing each G-PCC frame belonging to different temporal levels. If temporal scalability is supported, the G-PCC player (or the transmission device and/or the reception device of the present disclosure) may effectively access a desired component (target component) among G-PCC components. In addition, if temporal scalability is supported, since G-PCC frames are processed independently of each other, temporal scalability support at the system level may be expressed as more flexible temporal sub-layering. In addition, if temporal scalability is supported, the system (the point cloud content provision system) that processes G-PCC data can manipulate data at a high level to match network capability or decoder capability, the performance of the point cloud content provision system can be improved.

If temporal scalability is supported in the G-PCC file, the G-PCC player may operate as follows for each of the temporal level tracks and temporal level tile tracks to restore the G-PCC bitstream.

A. Regarding Temporal Level Tracks

The G-PCC player selects only G-PCC tracks with a temporal level id of 0.

The player extracts samples from the tracks selected in step 1 for a specific presentation time.

3. If the player decides to provide content with a higher temporal resolution, the player selects additional G-PCC tracks with a temporal level id of 1 or higher.

4. The player extracts G-PCC samples from the temporal level tracks selected in step 3 for a specific presentation time.

If the player decides to provide content with a lower temporal resolution, the player removes the G-PCC tracks with the highest temporal level id from the list of tracks selected in step 3.

B. Regarding Temporal Level Tile Tracks

1. The G-PCC player first selects target tiles and corresponding tile track(s) based on the user's viewport.

2. The player refines the selection criteria of the tile tracks selected in step 1 by selecting only tile tracks with a temporal level id of 0.

3. The player extracts tile samples from the tile tracks selected in step 2 for a specific presentation time.

4. If the player decides to provide content with a higher temporal resolution for the tiles selected in step 1, the player selects an additional G-PCC tile tracks with a temporal level id of 1 or higher from the list of tile tracks selected in step 1.

5. The player extracts samples for target tiles from the temporal level tile tracks selected in step 4 for a specific presentation time.

6. If the user changes the viewport, the player repeats the process of steps 1 to 5. If the user wishes to keep the previous temporal resolution for the new viewport, the player may skip step 3.

The existing player behavior for handling tracks for decoding and presentation (or playback) described above has a problem of inefficiency because it first starts at a track including a temporal level id of 0 and processing (that is, extraction of the sample from the track) is performed before finding other tracks. It may be more efficient to specify a target temporal level to operate first to the player, and then have the player select all tracks that have temporal levels less than or equal to the specified target temporal level.

Additionally, existing players have a problem in that it is unclear how to process samples that have been decoded but not yet presented when target parameters (or operation parameters) are changed.

To solve this problem, according to embodiments of the present disclosure, necessary tracks may be selected based on a target temporal level, and a sample extraction process from the selected tracks may be performed. Additionally, according to embodiments of the present disclosure, if the target parameter(s) are changed, the samples that are not decoded or presented may be discarded and the sample extraction process may be performed again based on the new target parameter(s). Embodiments of the present disclosure may be provided based on the following aspects.

—(Aspect 1): G-PCC file parser/player (hereinafter referred to as 'player') may operate based on at least the following parameters.

a) If the file does not contain a tile track, the player operates based on a predetermined target temporal level/id.

b) Otherwise (i.e. the file contains a tile track), the player operates based on the target temporal level/id and target tile id list.

—(Aspect 2): To handle temporal level tracks, the player may follow the following process.

a) First, a set of tracks (i.e., track set) that contains a temporal level less than or equal to a predetermined target temporal level is identified.

b) Samples belonging to a temporal level less than or equal to the predetermined target temporal level are extracted from the identified track set.

c) The extracted samples are delivered to the decoder according to each decoding time.

d) Once decoded, the decoded samples are delivered (to the renderer) for presentation (or playback) according to each presentation/synthesis time.

—(Aspect 3): To handle temporal level tile tracks, the player may follow the following process.

a) First, a set of tile tracks (i.e., a tile track set) containing a temporal level that is less than or equal to a predetermined target temporal level and a tile (or tile id) included in the target tile id list is identified.

b) Samples that belong to a temporal level that is less than or equal to the predetermined target temporal level and include a tile (or tile id) included in the target tile id list are extracted from the identified tile track set.

c) The extracted samples are delivered to the decoder according to each decoding time.

d) Once decoded, the decoded samples are delivered (to the renderer) for presentation (or playback) according to each presentation/synthesis time.

—(Aspect 4): If the target temporal level and/or target tile id list is changed, the following process may be performed.

a) The player discards samples that have been extracted but not yet decoded.

b) The player discards decoded samples that have not yet been presented (or played).

c) The player restarts the processes described in Aspect 1 or Aspect 2 above.

—(Aspect 5): Alternatively, when the target temporal level and/or target tile id list is changed, the following process may be performed.

a) The player discards samples that have been extracted but not yet decoded.

b) The player displays decoded samples that have not yet been presented (or played) according to each presentation/synthesis time. c) The player restarts the processes described in Aspect 1 or Aspect 2 above.

—(Configuration 6): Alternatively, when the target temporal level and/or target tile id list is changed, the following process may be performed.

a) The player delivers samples that have been extracted but not yet decoded to the decoder according to each decoding time.

b) The player presents decoded samples that have not yet been presented (or played) according to each presentation/synthesis time.

c) The player restarts the processes described in Aspect 1 or Aspect 2 above.

Embodiment 1

According to Embodiment 1 of the present disclosure, a G-PCC player may be provided with a predetermined target temporal level to handle temporal level tracks. The G-PCC player may identify temporal level tracks based on the target temporal level and perform a sample extraction process. Additionally, in order to handle temporal level tile tracks, the G-PCC player may be provided with a target temporal level and a target tile id list. The G-PCC player may identify temporal level tile tracks based on the target temporal level and target tile id list and perform a sample extraction process. Embodiment 1 of the present disclosure may be provided based on Aspects 1 to 4 described above. Hereinafter, Embodiment 1 of the present disclosure will be described in more detail with reference to the attached drawings.

Figure 15:
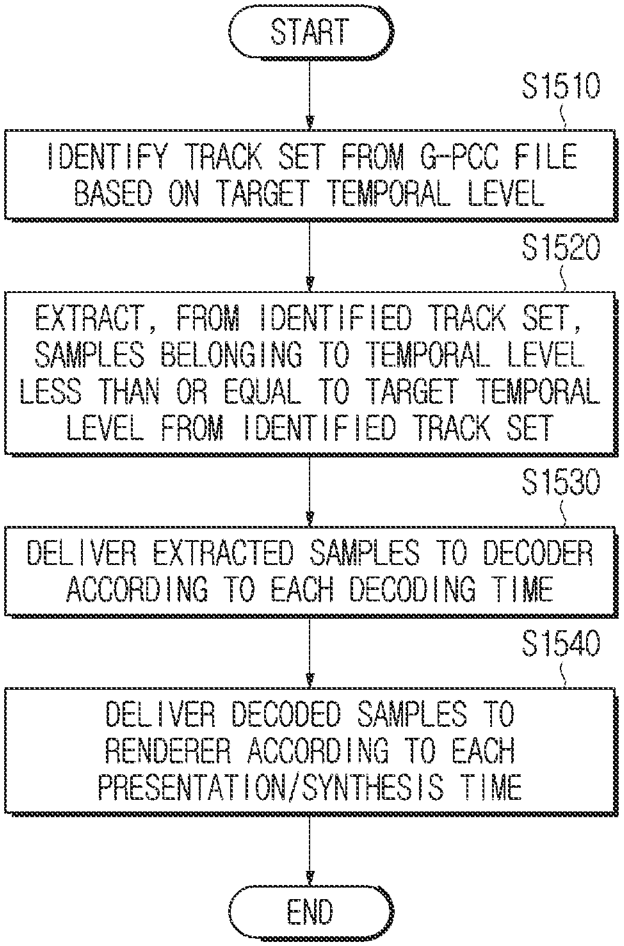
FIG. 15 is a flowchart illustrating a method of handling temporal level tracks according to an embodiment of the present disclosure.

FIG. 15 is a flowchart illustrating a method of handling temporal level tracks according to an embodiment of the present disclosure. Each step in FIG. 15 may be performed by the above-described (G-PCC file) reception device.

Referring to FIG. 15, the reception device may identify a track set including one or more tracks from a G-PCC file (S1510). At this time, each track included in the track set may include a temporal level that is less than or equal to a predetermined target temporal level. The reception device may extract samples belonging to a temporal level that is less than or equal to the target temporal level from the identified track set (S1520). The extracted samples may be delivered to a decoder (e.g., the decoding unit 23 in FIG. 1) according to each decoding time (S1530). Then, when the extracted samples are decoded, the decoded samples may be delivered to a renderer (e.g., the rendering unit 24 in FIG. 1) for presentation (or playback) according to each presentation/synthesis time.

In one embodiment, when the target temporal level is changed, the reception device may execute the steps described above and samples that have been decoded but not yet presented based on the previous target temporal level may be discarded.

Figure 16:
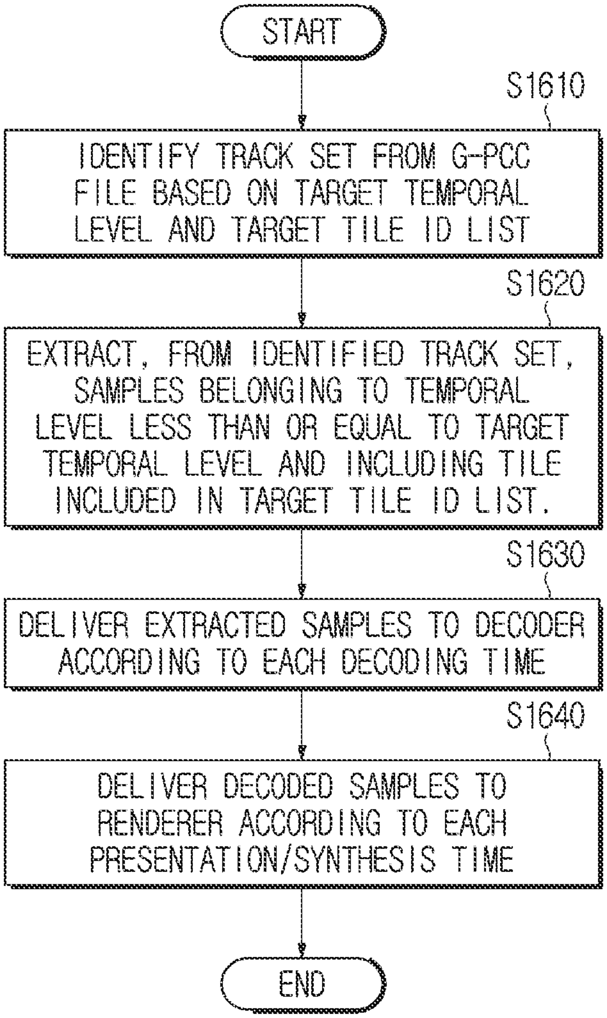
FIG. 16 is a flowchart illustrating a method of handling temporal level tile tracks according to an embodiment of the present disclosure.

FIG. 16 is a flowchart illustrating a method of handling temporal level tile tracks according to an embodiment of the present disclosure. Each step in FIG. 16 may be performed by the above-described (G-PCC file) reception device. Referring to FIG. 16, the reception device may identify a tile track set including one or more tile tracks from a G-PCC file (S1610). At this time, each tile track included in the tile track set may include a temporal level that is less than or equal to a predetermined target temporal level and a tile (or tile id) included in a target tile id list.

The reception device may extract, from the identified tile track set, samples belonging to a temporal level less than or equal to the target temporal level and including a tile (or tile id) included in the target tile id list (S1620). The extracted samples may be delivered to a decoder (e.g., the decoding unit 23 in FIG. 1) according to each decoding time (S1630). Then, when the extracted samples are decoded, the decoded samples may be delivered to a renderer (e.g., the rendering unit 24 in FIG. 1) for presentation (or playback) according to each presentation/synthesis time (S1640).

In one embodiment, when the target temporal level and/or target tile id list are changed, the reception device may re-execute the above-described steps starting from step S1610, and samples that have been decoded but not yet presented based on the previous target temporal level and target tile id list may be discarded.

Figure 17:
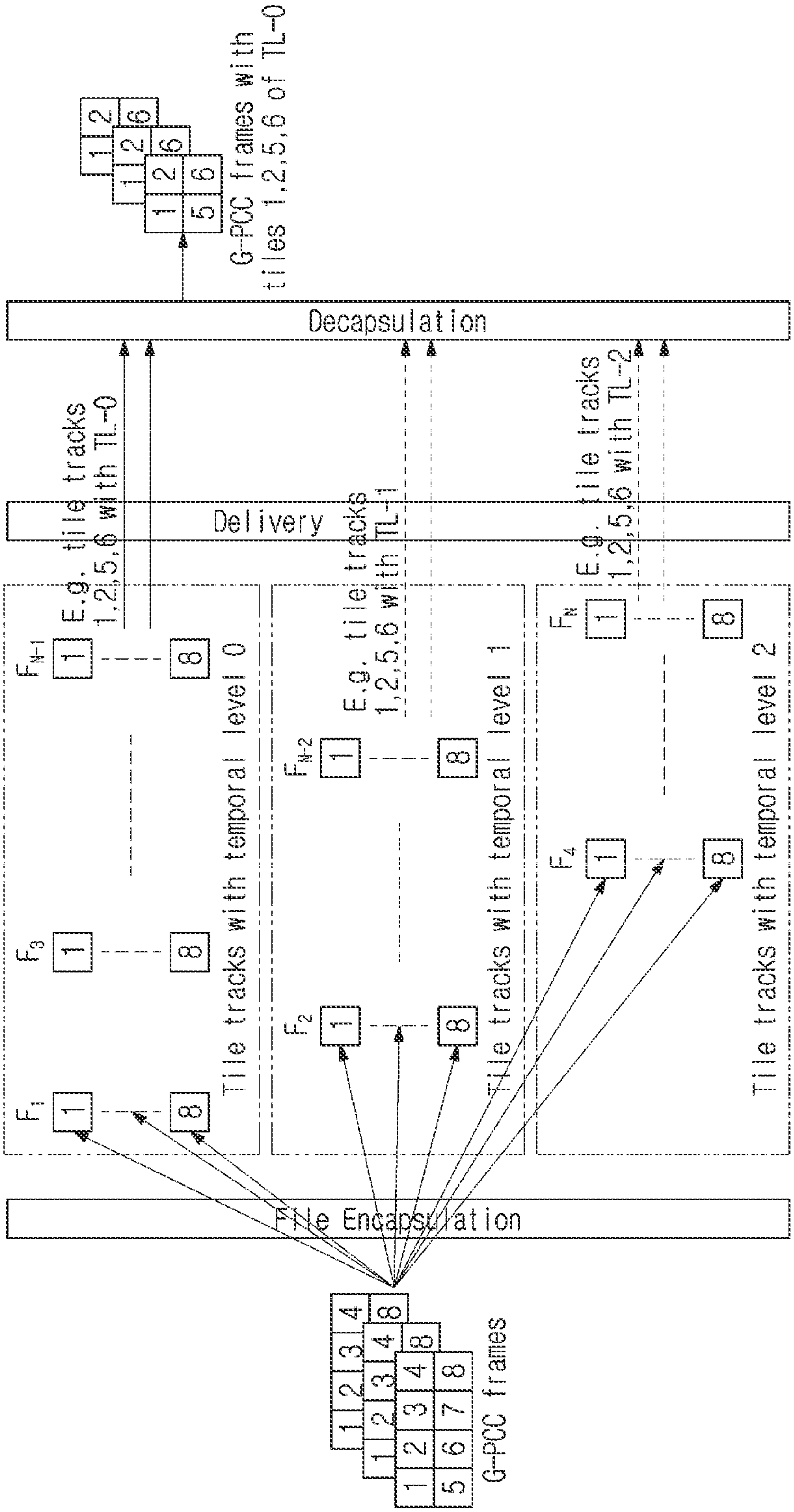
FIG. 17 is a diagram illustrating a method of generating multiple temporal level tile tracks and extracting samples therefrom according to an embodiment of the present disclosure.

FIG. 17 is a diagram illustrating a method of generating multiple temporal level tile tracks and extracting samples therefrom according to an embodiment of the present disclosure. Referring to FIG. 17. G-PCC frames may be partitioned into multiple temporal level tile tracks during an encapsulation process. For example, each G-PCC frame may consist of 8 tiles, and all G-PCC frames in a bitstream may be grouped into 3 temporal levels. G-PCC samples may be encapsulated within an ISOBMFF file using temporal level tile tracks. Each temporal level tile track may represent G-PCC samples of a specific tile belonging to a specific temporal level. Each tile track may carry all G-PCC component data.

According to embodiments of the present disclosure, the G-PCC player may select target tiles and corresponding temporal level tile tracks based on a given target temporal level and target tile id list based on the user's viewing orientation. Initially, the target temporal level is temporal level 0 and the target tile id list may include tile ids 1, 2, 5, and 6. Based on these targets, the player may select tile tracks 1, 2, 5, and 6 with a temporal level of 0, extract samples from the corresponding tile tracks, deliver the extracted samples to the decoder according to each decoding time and then present the (decoded) samples at each synthesis time. Assuming that the target temporal level is changed to 1 while keeping the target tile id list the same in the future, the player may select tile tracks 1, 2, 5, and 6 with temporal levels of 0 and 1, and extract samples from the tile tracks, deliver the extracted samples to the decoder according to each decoding time, and then present the (decoded) samples at each synthesis time.

Above, according to Embodiment 1 of the present disclosure, temporal level tracks/tile tracks may be handled based on predetermined target parameter(s). Specifically, the G-PCC player may identify temporal level tracks/tile tracks that are less than or equal to the target temporal level and perform a sampling process based on the target parameter(s). Additionally, if target parameters are changed, samples that have been decoded but not yet presented may be discarded. In this way, by handling temporal level tracks/tile tracks based on target parameters, file processing efficiency can be improved and player behavior can be clearer.

Meanwhile, when the above-described process is restarted with new target parameters, the following aspects may be provided to define player behavior.

—(Aspect 7): If the target temporal level and/or target tile id list are changed, the G-PCC player may discard the following samples.

a. Samples that have been extracted but not yet decoded, with a presentation time greater than the presentation time of the last displayed/presented sample.

b. Decoded samples that were not displayed/presented, samples with a presentation time greater than the presentation time of the last displayed/presented sample.

—(Aspect 8): The player may deliver the remaining extracted samples (that are not discarded) to the decoder according to each decoding time, and then deliver the decoded samples (to the renderer) to present (or play) them according to each presentation time.

—(Aspect 9): The player may record the presentation time of the last displayed/presented sample based on previous target parameter(s). The presentation time may be recorded in a variable lastPresentationTime.

—(Aspect 10): Finally, the player may perform a sample extraction process from selected tracks based on new target parameter(s). At this time, the extracted samples may be limited to have a presentation time greater than the value of the variable lastPresentationTime.

—(Aspect 11): As an alternative to Aspect 10 above, if the target temporal level and/or target tile id list are changed, the player may discard the following samples.

a. Samples that have been extracted but not yet decoded.

—(Aspect 12): The player may then deliver (to the renderer) each sample that has been decoded but not yet presented for presentation according to each presentation time.

—(Aspect 13): As another alternative to Aspect 10 above, if the target temporal level and/or target tile id list are changed, the player may set the value of a variable targetChangeTime and then discard the following samples. In one embodiment, the variable targetChangeTime may indicate the time at which the target parameter(s) were changed.

a. Samples that have been extracted but not yet decoded, with a presentation time greater than the variable targetChangeTime.

b. Samples that have been decoded but not yet presented, with a presentation time greater than the variable targetChangeTime.

—(Aspect 14): The variable targetChangeTime value may be set as follows.

a. Time when new target parameter(s) are given to the player b. Value obtained by adding a fixed offset time to the time when the new target parameter(s) are given to the player. Here, the offset time is set as a configuration parameter for the player behavior.

—(Aspect 15): When the remaining samples based on the previous target parameter(s) have been decoded and presented, the player may set the value of the variable lastPresentationTime equal to the presentation time of the last presented sample. Then, a sample extraction process may be performed based on the new target parameter(s).

—(Aspect 16): When the player receives new target parameter(s), a. If the (G-PCC) file does not contain a tile track, the player operates based on the given target temporal level/id and variable lastPresentationTime.

b. Otherwise (i.e., if the file contains a tile track), the player operates based on the given target temporal level/id, target tile id list, and variable lastPresentationTime.

c. If the (sample) extraction process is performed for the first time, the value of the variable lastPresentationTime is set to 0.

—(Aspect 17): To handle temporal level tracks, the player may follow the following process.

a. First, a set of tracks (i.e., track set) that contains a temporal level less than or equal to a predetermined target temporal level is identified.

b. Samples belonging to a temporal level less than or equal to the predetermined target temporal level and having a presentation time greater than the value of a given variable lastPresentationTime are extracted from the identified track set.

c. The extracted samples are delivered to the decoder according to each decoding time.

d. Once decoded, the decoded samples are delivered (to the renderer) for presentation (or playback) according to each presentation/synthesis time.

—(Aspect 18): To handle temporal level tile tracks, the player may follow the following process.

a. First, a set of tile tracks (i.e., a tile track set) containing a temporal level that is less than or equal to a predetermined target temporal level and a tile (or tile id) included in the target tile id list is identified.

b. Samples belonging to a temporal level less than or equal to the target temporal level, including a tile (or tile id) included in the target tile id list, and having a presentation time greater than a given variable lastPresentationTime are extracted from the identified tile track set.

c. The extracted samples are delivered to the decoder according to each decoding time.

d. Once decoded, the decoded samples are delivered (to the renderer) for presentation (or playback) according to each presentation/compositing time.

Embodiment 2

According to Embodiment 2 of the present disclosure, in order to handle temporal level tracks, a G-PCC player may be provided with a predetermined target temporal level and a variable lastPresentationTime. The G-PCC player may identify temporal level tracks based on the target temporal level and perform a sampling process further based on the variable lastPresentationTime. Additionally, to handle temporal level tile tracks, the G-PCC player may be provided with a predetermined target temporal level, a target tile id list, and a variable lastPresentationTime. The G-PCC player may identify temporal level tracks/tile tracks based on the target temporal level and target tile id list, and perform a sample extraction process further based on the variable lastPresentationTime. Meanwhile, according to Embodiment 2 of the present disclosure, when the above-described target parameter(s) are changed, samples that are not decoded or presented (i.e., played) may be discarded according to predetermined requirements. Embodiment 2 of the present disclosure may be provided based on Aspects 7 to described above. Hereinafter, Embodiment 2 of the present disclosure will be described in more detail with reference to the attached drawings.

Figure 18:
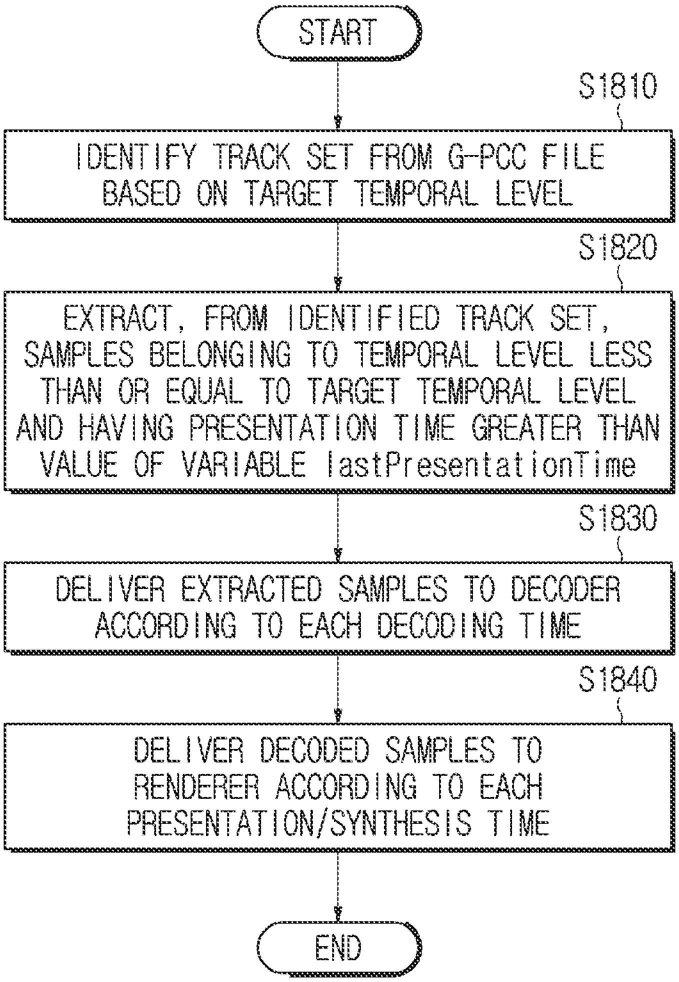
FIG. 18 is a flowchart illustrating a method of handling temporal level tracks according to an embodiment of the present disclosure.

FIG. 18 is a flowchart illustrating a method of handling temporal level tracks according to an embodiment of the present disclosure. Each step in FIG. 18 may be performed by the above-described (G-PCC file) reception device.

Referring to FIG. 18, the reception device may identify a track set including one or more tracks from a G-PCC file (S1810). At this time, each track included in the track set may include a temporal level that is less than or equal to a predetermined target temporal level. The reception device may extract, from the identified track set, samples that belong to a temporal level less than or equal to the target temporal level and have a presentation time greater than the value of the variable lastPresentationTime (S1820). In one example, the value of the variable lastPrsentationTime may be set equal to the presentation time of the last presented sample. The extracted samples may be delivered to a decoder (e.g., the decoding unit in FIG. 1) according to each decoding time (S1830). Then, w % ben the extracted samples are decoded, the decoded samples may be delivered to a renderer (e.g., the rendering unit 24 in FIG. 1) for presentation (or playback) according to each presentation/synthesis time.

Figure 19:
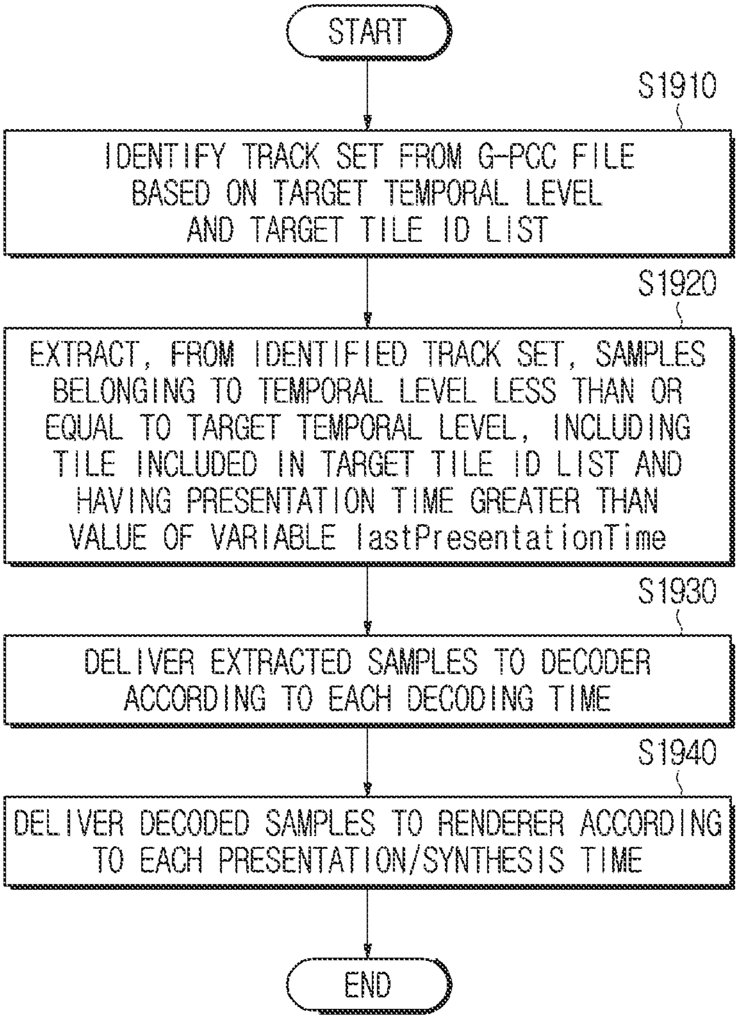
FIG. 19 is a flowchart illustrating a method of handling temporal level tile tracks according to an embodiment of the present disclosure.

FIG. 19 is a flowchart illustrating a method of handling temporal level tile tracks according to an embodiment of the present disclosure. Each step in FIG. 19 may be performed by the above-described (G-PCC file) reception device.

Referring to FIG. 19, the reception device may identify a tile track set including one or more tile tracks from a G-PCC file (S1910). At this time, each tile track included in the tile track set may include a temporal level that is less than or equal to a predetermined target temporal level and a tile (or tile id) included in a target tile id list.

The reception device may extract, from the identified tile track set, samples that belong to a temporal level less than or equal to the target temporal level, include a tile (or tile id) included in the target tile id list, and have a presentation time greater than the value of a variable lastPrsentationTime (S1920). In one example, the value of the variable lastPrsentationTime may be set equal to the presentation time of the last presented sample. The extracted samples may be delivered to a decoder (e.g., the decoding unit 23 in FIG. 1) according to each decoding time (S1930). Then, when the extracted samples are decoded, the decoded samples may be delivered to a renderer (e.g., the rendering unit 24 in FIG. 1) for presentation (or playback) according to each presentation/synthesis time (S1940).

In one embodiment, when the sampling process of FIGS. 18 and 19 is performed for the first time, the variable lastPrsentationTime value may be set equal to the least possible presentation time.

Figure 20:
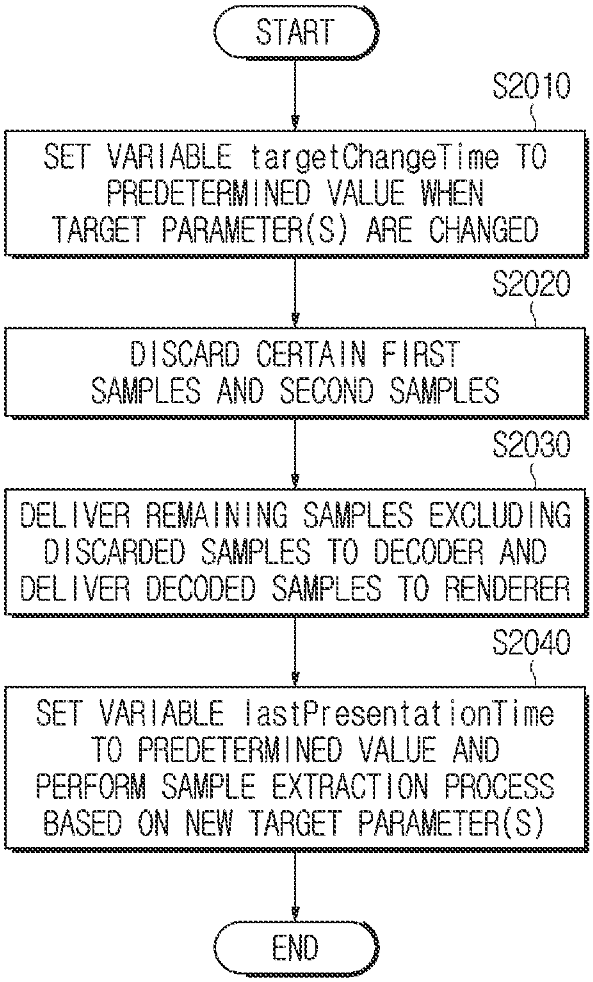
FIG. 20 is a flowchart illustrating a sample processing method when a target parameter is changed according to an embodiment of the present disclosure.

FIG. 20 is a flowchart showing a sample processing method when a target parameter is changed according to an embodiment of the present disclosure. Each step in FIG. 20 may be performed by the (G-PCC) reception device described above.

Referring to FIG. 20, when the target parameter(s) (e.g., target temporal level and/or target tile id list) are changed, the reception device may set the variable targetChangeTime to a value obtained by adding a fixed offset time to the time when the new target parameter(s) are given (S2010). In one embodiment, the fixed offset time may be set enterally. For example, the fixed offset time may be one of the configuration parameters for player behavior.

The reception device may discard certain first samples and second samples (S2020). Here, the first samples may include samples that have been extracted but not yet decoded and have a presentation time greater than the value of the variable targetChangeTime. Additionally, the second samples may include samples that have been decoded but not yet presented and have a presentation time greater than the value of the variable targetChangeTime.

The reception device may deliver the remaining extracted samples excluding the discarded samples to the decoder according to each decoding time, and then deliver the decoded samples (to the renderer) for presentation (or playback) according to each presentation time (S2030).

Additionally, the reception device may set the value of the variable lastPresentationTime equal to the presentation time of the last presented sample and perform a sample extraction process based on the new target parameter(s) (S2040).

Above, according to Embodiment 2 of the present disclosure, temporal level tracks/tile tracks may be handled based on predetermined target parameter(s) and variable lastPresentationTime. Specifically, the G-PCC player may identify temporal level tracks/tile tracks that are less than or equal to the target temporal level and perform a sampling process based on the target parameter(s) and the variable lastPresentationTime. In addition, when target parameters are changed, samples that have been decoded but not yet presented may be discarded and the variable targetChangeTime may be set to a predetermined value. In this way, by handling temporal level tracks/tile tracks based on target parameter(s) and variable lastPresentationTime, file processing efficiency can be improved and player behavior can be clearer.

Hereinafter, a method performed in a reception device of point cloud data and a method performed in a transmission device of point cloud data according to embodiments of the present disclosure will be described in detail.

Figure 21:
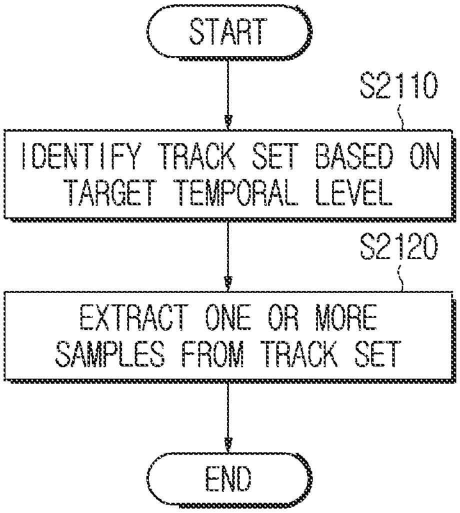
FIG. 21 is a flowchart illustrating a method performed in a reception device of point cloud data according to an embodiment of the present disclosure.

FIG. 21 is a flowchart illustrating a method performed in a reception device of point cloud data according to an embodiment of the present disclosure.

Referring to FIG. 21, the reception device may identify a track set including one or more tracks from point cloud data from point cloud data based on a predetermined target temporal level (S2110). Then, the reception device may extract one or more samples from the identified track set (S2120) and then deliver the extracted samples to the decoder.

In one embodiment, based on the tracks being temporal level tile tracks, each track included in the track set may include a tile identifier included in a predetermined target tile identifier list.

In one embodiment, based on the tracks being temporal level tracks, each extracted sample may belong to a temporal level less than or equal to the target temporal level.

In one embodiment, based on the tracks being temporal level tracks, each extracted sample may belong to a temporal level less than or equal to the target temporal level and have a presentation time greater than a predetermined first presentation time. Here, the first presentation time may be set to the presentation time of the last played sample among the extracted samples. Alternatively, based on extraction of the samples being performed first, the first presentation time may be set to the minimum possible presentation time.

In one embodiment, based on the tracks being temporal level tile tracks, each extracted sample may belong to a temporal level less than or equal to the target temporal level and include a tile identifier included in the target tile identifier list.

In one embodiment, based on the tracks being temporal level tile tracks, each extracted sample may belong to a temporal level less than or equal to the target temporal level, include a tile identifier included in the target tile identifier list, and have a presentation time greater than a predetermined first presentation time.

In one embodiment, a predetermined target change time is set based on a change in at least one of the target parameters including the target temporal level, and first samples and second samples having a presentation time greater than the target change time among the extracted samples may be discarded. Here, the first samples may include samples that have not been decoded among the extracted samples, and the second samples may include samples that have been decoded but not played among the extracted samples. Meanwhile, among the extracted samples, the remaining samples excluding the discarded samples may be delivered to the decoder, and the above-described sample extraction process (S2110 and S2120) may be performed again based on the changed at least one target parameter.

Figure 22:
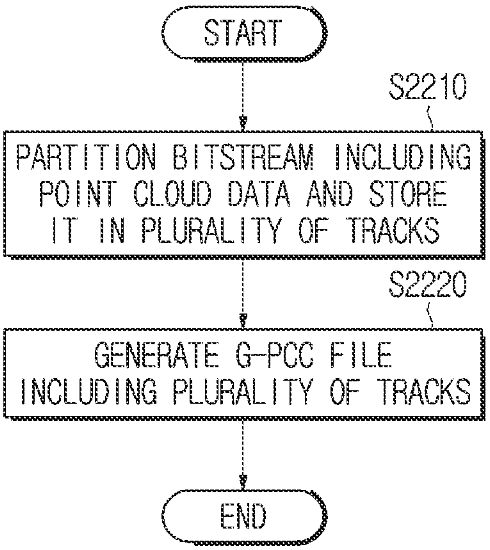
FIG. 22 is a flowchart illustrating a method performed in a transmission device of point cloud data according to an embodiment of the present disclosure.

FIG. 22 is a flowchart showing a method performed in a transmission device of point cloud data according to an embodiment of the present disclosure.

Referring to FIG. 22, the transmission device may partition a bitstream including point cloud data and store it in a plurality of tracks (S2210). In addition, the transmission device may generate a G-PCC (geometry-based point cloud compression) file including the tracks (52220).

In one embodiment, the plurality of tracks may include at least one of temporal level tracks or temporal level tile tracks. In this case, the temporal level tracks may be decapsulated by a sampling extraction process based on a predetermined target temporal level. Additionally, the temporal level tile tracks may be decapsulated by a sample extraction process based on the target temporal level and a predetermined target tile identifier list. Embodiments of the present disclosure may be applied for the decapsulation, and details thereof are as described above with reference to FIGS. 15 to 20.

Above, according to embodiments of the present disclosure, a necessary track set may be identified based on predetermined target parameter(s), and a sample extraction process may be performed from the identified track set. Additionally, if the target parameter(s) are changed, samples that have not been decoded or not presented may be discarded and the sampling process may be performed again based on the new target parameter(s). Accordingly, file processing efficiency can be improved and player behaviors can become clearer.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc. The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to provide point cloud content. In addition, the embodiments of the present disclosure may be used to encode/decode point cloud data.

The invention claimed is:

1. A method performed in a reception device of point cloud data, the method comprising:

determining a target temporal level;

identifying a track set including one or more tracks from the point cloud data based on the target temporal level; and extracting one or more samples from the identified track set, wherein each track included in the track set includes a temporal level less than or equal to the target temporal level, wherein based on the tracks being temporal level tracks, each of the extracted samples belongs to a temporal level less than or equal to the target temporal level and has a presentation time greater than a predetermined first presentation time, and wherein the first presentation time is set to a presentation time of a last played sample among the extracted samples.

2. The method of claim 1, wherein based on the tracks being temporal level tile tracks, each track included in the track set includes a tile identifier included in a predetermined target tile identifier list.

3. The method of claim 1, wherein based on extraction of the samples being performed first, the first presentation time is set to a minimum possible presentation time.

4. The method of claim 1, wherein based on the tracks being temporal level tile tracks, each of the extracted samples belongs to a temporal level less than or equal to the target temporal level and includes a tile identifier included in the target tile identifier list.

5. The method of claim 1, wherein based on the tracks being temporal level tile tracks, each of the extracted samples belongs to a temporal level less than or equal to the target temporal level, includes a tile identifier included in the target tile identifier list, and has a presentation time greater than a predetermined first presentation time.

6. The method of claim 1, wherein based on at least one of target parameters including the target temporal level being changed, a target change time is set to a predetermined value, and wherein first samples and second samples having a presentation time greater than the target change time among the extracted samples are discarded.

7. The method of claim 6, wherein the first samples include samples that are not decoded among the extracted samples, and wherein the second samples include samples that have been decoded but not played back among the extracted samples.

8. The method of claim 6, wherein the remaining samples excluding the discarded samples among the extracted samples are delivered to a decoder, and wherein the identifying the track set is performed again based on the changed at least one target parameter.

9. A reception device of point cloud data, the reception device comprising:

a memory; and at least one processor, wherein the at least one processor is configured to:

determine a target temporal level;

identify a track set including one or more tracks from the point cloud data based on the target temporal level; and extract one or more samples from the identified track set, wherein each track included in the track set includes a temporal level less than or equal to the target temporal level, wherein based on the tracks being temporal level tracks, each of the extracted samples belongs to a temporal level less than or equal to the target temporal level and has a presentation time greater than a predetermined first presentation time, and wherein the first presentation time is set to a presentation time of a last played sample among the extracted samples.

10. The reception device of claim 9, wherein based on the tracks being temporal level tile tracks, each track included in the track set includes a tile identifier included in a predetermined target tile identifier list.

11. A method performed in a transmission device of point cloud data, the method comprising:

partitioning a bitstream including the point cloud data and storing it in a plurality of tracks; and generating a geometry-based point cloud compression (G-PCC) file based on the tracks, wherein the plurality of tracks includes at least one of temporal level tracks or temporal level tile tracks, wherein the temporal level tracks are configured to be decapsulated by the sample extraction process to extract one or more samples, wherein each of the extracted samples belongs to a temporal level less than or equal to a target temporal level and has a presentation time greater than a predetermined first presentation time based on the target temporal level, and wherein the first presentation time is set to a presentation time of a last played sample among the extracted samples.

12. A transmission device of point cloud data, the transmission device comprising:

a memory; and at least one processor, wherein the at least one processor is configured to:

partition a bitstream including the point cloud data and store it in a plurality of tracks; and generate a geometry-based point cloud compression (G-PCC) file based on the tracks, wherein the plurality of tracks includes at least one of temporal level tracks or temporal level tile tracks, wherein the temporal level tracks are configured to be decapsulated by the sample extraction process to extract one or more samples, wherein each of the extracted samples belongs to a temporal level less than or equal to a target temporal level and has a presentation time greater than a predetermined first presentation time based on the target temporal level, and wherein the first presentation time is set to a presentation time of a last played sample among the extracted samples.

* * * * *